(12) United States Patent
Shirguppe

(10) Patent No.: US 12,705,917 B2
(45) Date of Patent: Aug. 11, 2026

(54) AMBIGUITY RESOLUTION FOR OBJECT SELECTION AND FASTER APPLICATION LOADING FOR CLUTTERED SCENARIOS

(71) Applicant: QUALCOMM Incorporated, San Diego, CA (US)

(72) Inventor: Siddhant Sanjay Shirguppe, Belgaum (IN)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/339,034

(22) Filed: Jun. 21, 2023

(65) Prior Publication Data

US 2024/0428608 A1 Dec. 26, 2024

(51) Int. Cl.

| | |
|---|---|
| ***G06V 40/10*** | (2022.01) |
| ***G06T 17/00*** | (2006.01) |
| ***G06V 10/74*** | (2022.01) |
| ***G06V 10/762*** | (2022.01) |

(52) U.S. Cl.
CPC .............. *G06V 40/11* (2022.01); *G06T 17/00* (2013.01); *G06V 10/761* (2022.01); *G06V 10/762* (2022.01); *G06V 2201/07* (2022.01)

(58) Field of Classification Search
None
See application file for complete search history.

(56) References Cited

U.S. PATENT DOCUMENTS

2012/0113223 A1 5/2012 Hilliges et al.
2015/0084884 A1* 3/2015 Cherradi El Fadili ...................... G06F 3/0233 345/173
2016/0096073 A1* 4/2016 Rahman .................. G06F 3/011 463/7
2017/0169616 A1* 6/2017 Wiley ................. G06F 3/04815
2018/0061003 A1* 3/2018 Kono ........................ G06T 3/20
2018/0197624 A1* 7/2018 Robaina ............... A61B 5/1171
2019/0033977 A1* 1/2019 Von Wendorff ..... G06V 40/113
(Continued)

FOREIGN PATENT DOCUMENTS

WO 2016099561 A1 6/2016
WO 2019229698 A1 12/2019

OTHER PUBLICATIONS

International Search Report and Written Opinion—PCT/US2024/027524—ISA/EPO—Aug. 12, 2024.

*Primary Examiner* — Soo Shin
(74) *Attorney, Agent, or Firm* — Polsinelli LLP/QUALCOMM Incorporated

(57) ABSTRACT

Techniques and systems are provided for identifying a virtual object. For instance, a process can include a method for identifying an object. The method may include: receiving pose information associated with a pose of a hand; identifying a cluster of virtual objects the hand is moving toward based on the received pose information, wherein the cluster of virtual objects includes a plurality of independent virtual objects; obtaining a set of expected hand postures associated with virtual objects of the cluster of virtual objects; determining a hand posture based on the received pose information; matching the hand posture to an expected hand posture of the set of expected hand postures to determine an initial hand posture of the hand; and identifying a first initial object of the cluster of virtual objects based on the initial hand posture.

31 Claims, 11 Drawing Sheets

(56) References Cited

U.S. PATENT DOCUMENTS

2019/0079591 A1* 3/2019 Glaser ................ G06Q 30/0633
2020/0027275 A1* 1/2020 Wan ........................ G06F 3/016
2021/0026455 A1* 1/2021 Dash ....................... G06F 3/017
2021/0090332 A1* 3/2021 Ravasz .................. G06V 40/28
2021/0365104 A1 11/2021 Ke et al.
2021/0365228 A1 11/2021 Stoyles et al.
2022/0137701 A1 5/2022 Bowman et al.
2022/0214743 A1* 7/2022 Dascola .................. G06F 3/017
2022/0229524 A1* 7/2022 Mckenzie ............... G06F 3/038
2022/0229534 A1* 7/2022 Terre ................... G06F 3/04815
2022/0334649 A1 10/2022 Hwang et al.
2022/0414999 A1 12/2022 Ravasz et al.
2024/0103686 A1* 3/2024 Pazmino ................. G06F 3/011

* cited by examiner

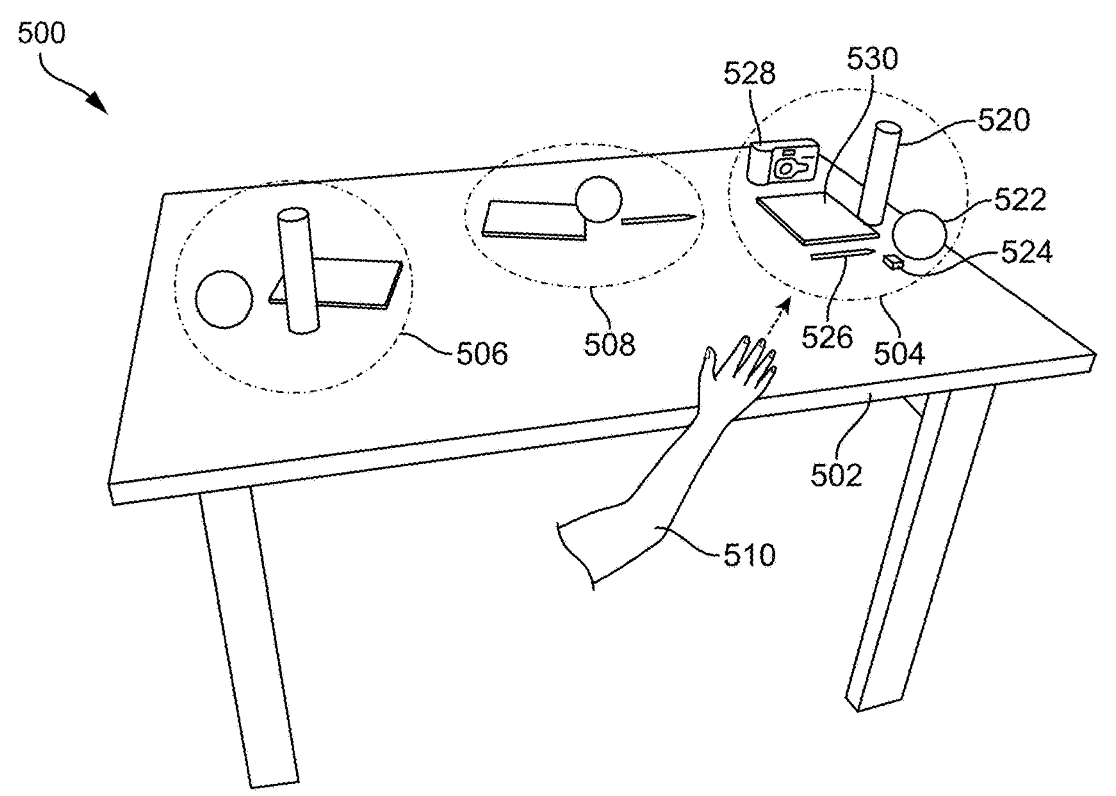
FIG. 5
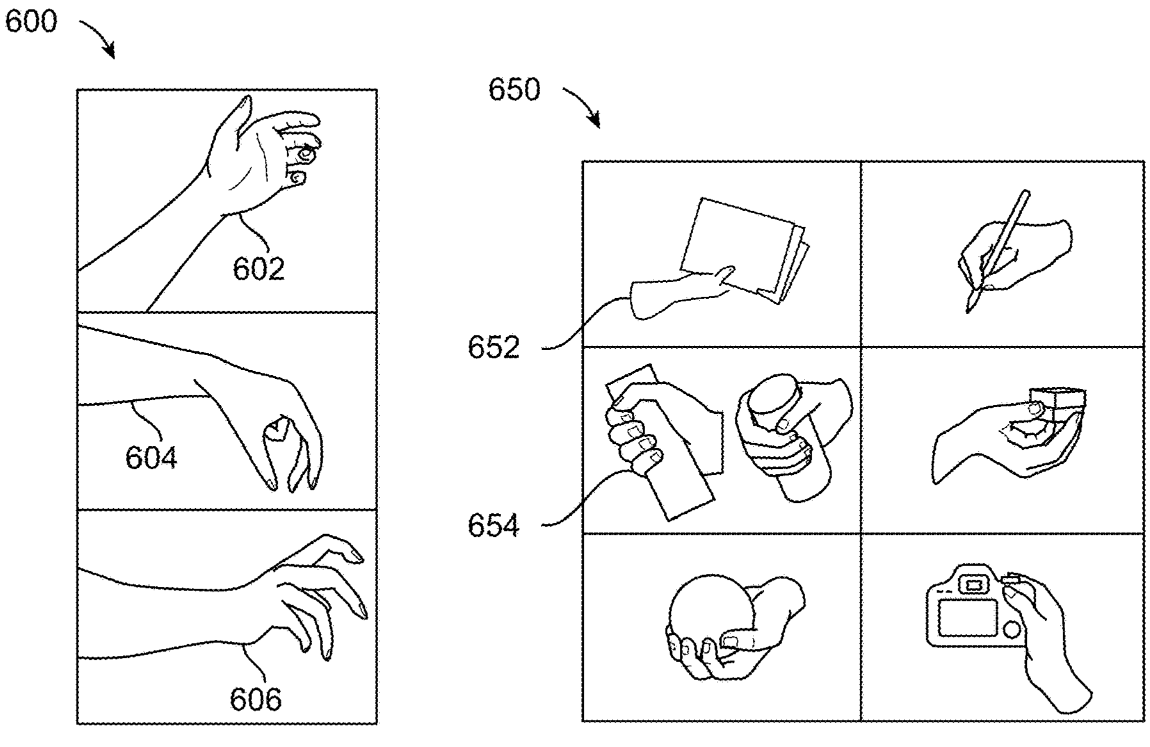
FIG. 6A
FIG. 6B

AMBIGUITY RESOLUTION FOR OBJECT SELECTION AND FASTER APPLICATION LOADING FOR CLUTTERED SCENARIOS

FIELD

The present application is related to processing one or more images for extended reality (XR) systems. For example, aspects of the application relate to systems and techniques for performing ambiguity resolution for object selection and faster application loading for cluttered scenarios in XR systems.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto images of a real-world environment, which can be viewed by a user through an XR device (e.g., a head-mounted display (HMD), extended reality glasses, or other device). For example, an XR device can display an XR environment to a user. The XR environment is at least partially different from the real-world environment in which the user is in. The user can generally change their view of the XR environment interactively, for example by tilting or moving the XR device (e.g., the HMD or other device).

In some cases, an XR system can include a "see-through" display that allows the user to see their real-world environment based on light from the real-world environment passing through the display. In some cases, an XR system can include a "pass-through" display that allows the user to see their real-world environment, or a virtual (e.g., XR) environment based on their real-world environment, based on a view of the real-world environment being captured by one or more cameras and displayed on the display. "See-through" or "pass-through" XR systems can be worn by users while the users are engaged in activities in their real-world environment.

XR systems may also include hand tracking, which allows users to see and use their hands to interact with the XR environment. As an example, applications which may be used in the XR environment may be represented by objects in the XR environment and the user may touch, grab, or otherwise interact with these objects, for example, to launch the application represented by an object.

SUMMARY

Systems and techniques are described herein for displaying augmented reality enhanced media content. For example, aspects of the present disclosure relate to ambiguity resolution for object selection and faster application loading for cluttered scenarios in XR systems.

In one illustrative example, an apparatus for identifying an object is provided. The apparatus includes at least one memory and at least one processor coupled to the at least one memory. The at least one processor is configured to: receive pose information associated with a pose of a hand; identify a cluster of virtual objects the hand is moving toward based on the received pose information, wherein the cluster of virtual objects includes a plurality of independent virtual objects; obtain a set of expected hand postures associated with virtual objects of the cluster of virtual objects; determine a hand posture based on the received pose information; match the hand posture to an expected hand posture of the set of expected hand postures to determine an initial hand posture of the hand; and identify a first initial object of the cluster of virtual objects based on the initial hand posture. In some cases, a posture may refer to a mapped pose (e.g., initial posture, final posture, etc.) of an object, such as a hand.

As another example, a method for identifying an object is provided. The method includes: receiving pose information associated with a pose of a hand; identifying a cluster of virtual objects the hand is moving toward based on the received pose information, wherein the cluster of virtual objects includes a plurality of independent virtual objects; obtaining a set of expected hand postures associated with virtual objects of the cluster of virtual objects; determining a hand posture based on the received pose information; matching the hand posture to an expected hand posture of the set of expected hand postures to determine an initial hand posture of the hand; and identifying a first initial object of the cluster of virtual objects based on the initial hand posture.

In another example, a non-transitory computer-readable medium having stored thereon instructions is provided. The instructions, when executed by at least one processor, cause the at least one processor to: receive pose information associated with a pose of a hand; identify a cluster of virtual objects the hand is moving toward based on the received pose information, wherein the cluster of virtual objects includes a plurality of independent virtual objects; obtain a set of expected hand postures associated with virtual objects of the cluster of virtual objects; determine a hand posture based on the received pose information; match the hand posture to an expected hand posture of the set of expected hand postures to determine an initial hand posture of the hand; and identify a first initial object of the cluster of virtual objects based on the initial hand posture.

As another example, an apparatus for identifying an object is provided. The apparatus includes: a means for identifying an object, comprising: receiving pose information associated with a pose of a hand; means for identifying a cluster of virtual objects the hand is moving toward based on the received pose information, wherein the cluster of virtual objects includes a plurality of independent virtual objects; obtaining a set of expected hand postures associated with virtual objects of the cluster of virtual objects; means for determining a hand posture based on the received pose information; means for matching the hand posture to an expected hand posture of the set of expected hand postures to determine an initial hand posture of the hand; and means for identifying a first initial object of the cluster of virtual objects based on the initial hand posture.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 5 illustrates an example scene for an XR system, in accordance with aspects of the present disclosure.

FIG. 6A illustrates a set of initial hand postures, in accordance with aspects of the present disclosure.

FIG. 6B illustrates a set of final hand postures, in accordance with aspects of the present disclosure

DETAILED DESCRIPTION

Figure 1:
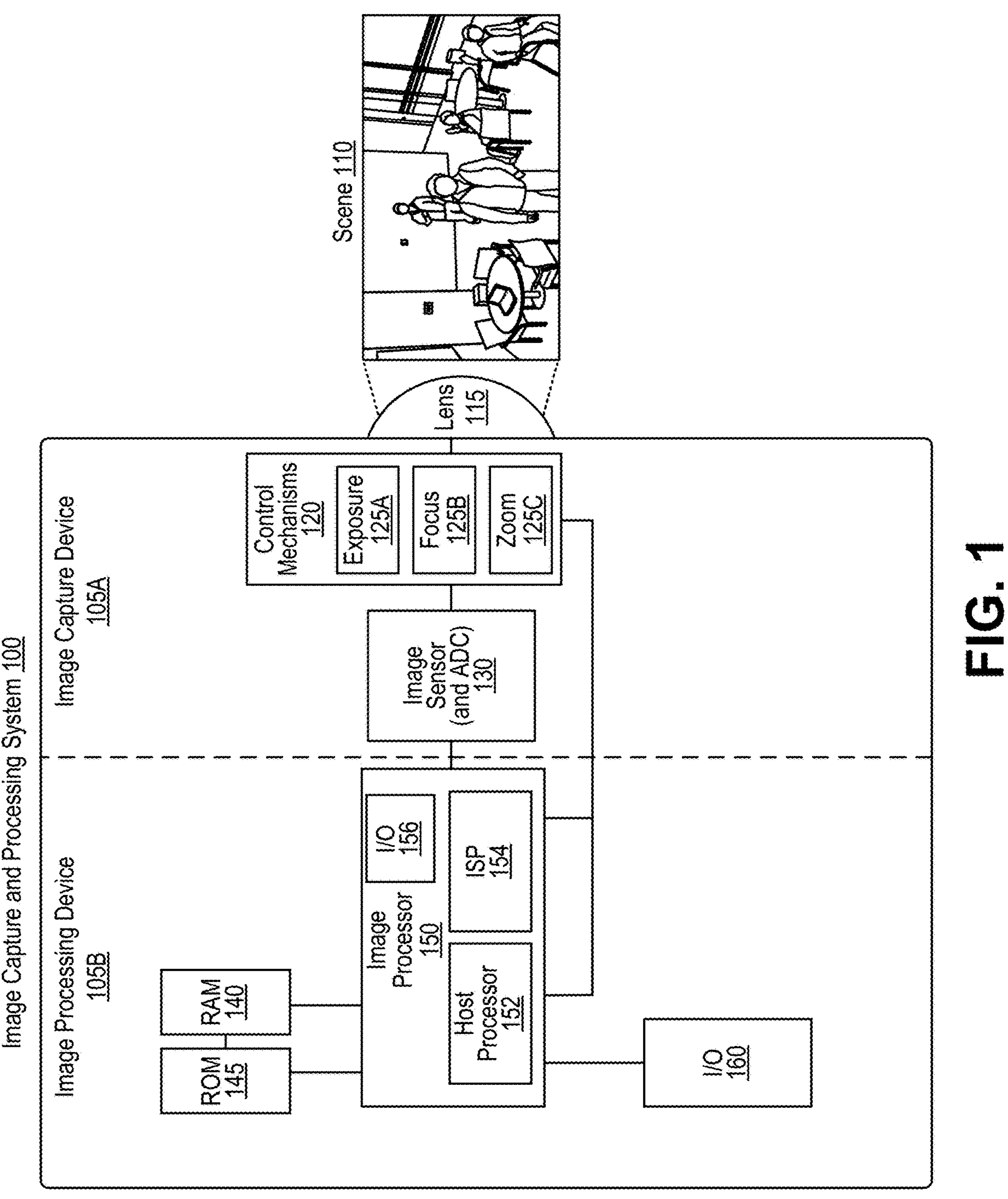
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

A camera (e.g., image capture device) is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems.

Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

In some cases, an XR system may allow a user to start and interact with applications that may be executed within the XR environment displayed by the XR system. For example, applications may execute within a context of an XR system, in a manner similar to how applications may execute within a windowed graphical user interface (GUI) of an operating system (OS). As a part of allowing applications to execute within the context of the XR system, a representation of the applications available to be used may be displayed. In some cases, rather than representing applications using two dimensional (2D) icons, applications may be represented in an XR system by three dimensional (3D) objects. In some cases, these 3D objects may be interactive and moveable. Thus, users may move these 3D objects to different places within an XR environment and arrange these 3D objects as desired for use. For example, a user may place 3D objects representing different applications on a virtual desk. In some cases, these 3D objects may be placed into clusters. For example, on this virtual desk, the 3D objects may be arranged into a first cluster of 3D objects on a right side of the virtual desk and a second cluster of 3D objects on a left side of the virtual desk. In some cases, when there are multiple 3D objects clustered in a relatively small region (referred to as a cluttered object scenario), there may be a level of ambiguity involved in an attempt to interact with a 3D object of the cluster of 3D objects.

Systems, apparatuses, electronic devices, methods (also referred to as processes), and computer-readable media (collectively referred to herein as "systems and techniques") are described herein for resolving ambiguities for XR object (e.g., 3D object) selection and accelerated loading in cluttered object scenarios. In some cases, a user may interact with a 3D object associated with an application in order to start the application. For example, picking up the 3D object may cause the application associated with the 3D object to be started. In some cases, different 3D objects, such as real objects (e.g., physical objects in a real-world environment), may be held in different ways. As an example, a pose of a hand picking up a can is different from the pose of the hand picking up a pen.

In some cases, interactive 3D objects may be associated with one or more hand poses that may be used to interact with the 3D objects. As a hand being tracked by the XR system is moved towards a cluster of 3D objects, the cluster of 3D objects may be identified based on pose information about the hand. In some cases, the pose information indicates a position and location information about an object. The pose information may also be provided along with direction information indicating a direction the object is moving. For example, based on a direction the hand is moving, the cluster of 3D objects may be identified. The direction indication may indicate a current direction the object is moving, as opposed to pose information, which may indicate directions an object has moved over time. In some cases, a set of expected hand postures may be obtained for 3D objects in the identified cluster. For example, expected hand postures for interacting with the 3D objects in the identified cluster may be identified. A hand pose may be matched against the set of expected hand postures to determine an initial hand posture of the hand. Based on this initial hand posture an initial object of the cluster of objects may be identified. In some cases, an application associated with the initial object may be started.

In some cases, a set of initial objects may be identified as the initial hand posture may match expected hand postures associated with the 3D objects of the set of initial objects. In such cases, one application, associated with one 3D object of the set of initial objects, may be preloaded. In some cases, background processes of the other applications associated with other 3D objects (e.g., not the one 3D object), may be preloaded. In some cases, a foreground process of the one application may be started. In some examples, preloading of either the foreground process and/or background process may be performed during a time period (e.g., a time gap) between when the initial hand posture is identified and when a final hand posture is identified/matched.

In some cases, as the hand is moved closer to an intended 3D object of the cluster of objects, a final hand pose for the hand may be assumed for interacting with the intended 3D object. This final hand pose may be matched against a set of final hand postures associated with the set of initial objects to identify a selected object. A foreground process of an application associated with the selected object may be started (if not already started). Any preloaded background processes for other applications may be removed.

The systems and techniques described herein provide advantages over existing solutions. For example, using the initial hand posture to identify a set of applications to preload can make such systems more responsive and appear to load applications faster without additional hardware requirements.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered by color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
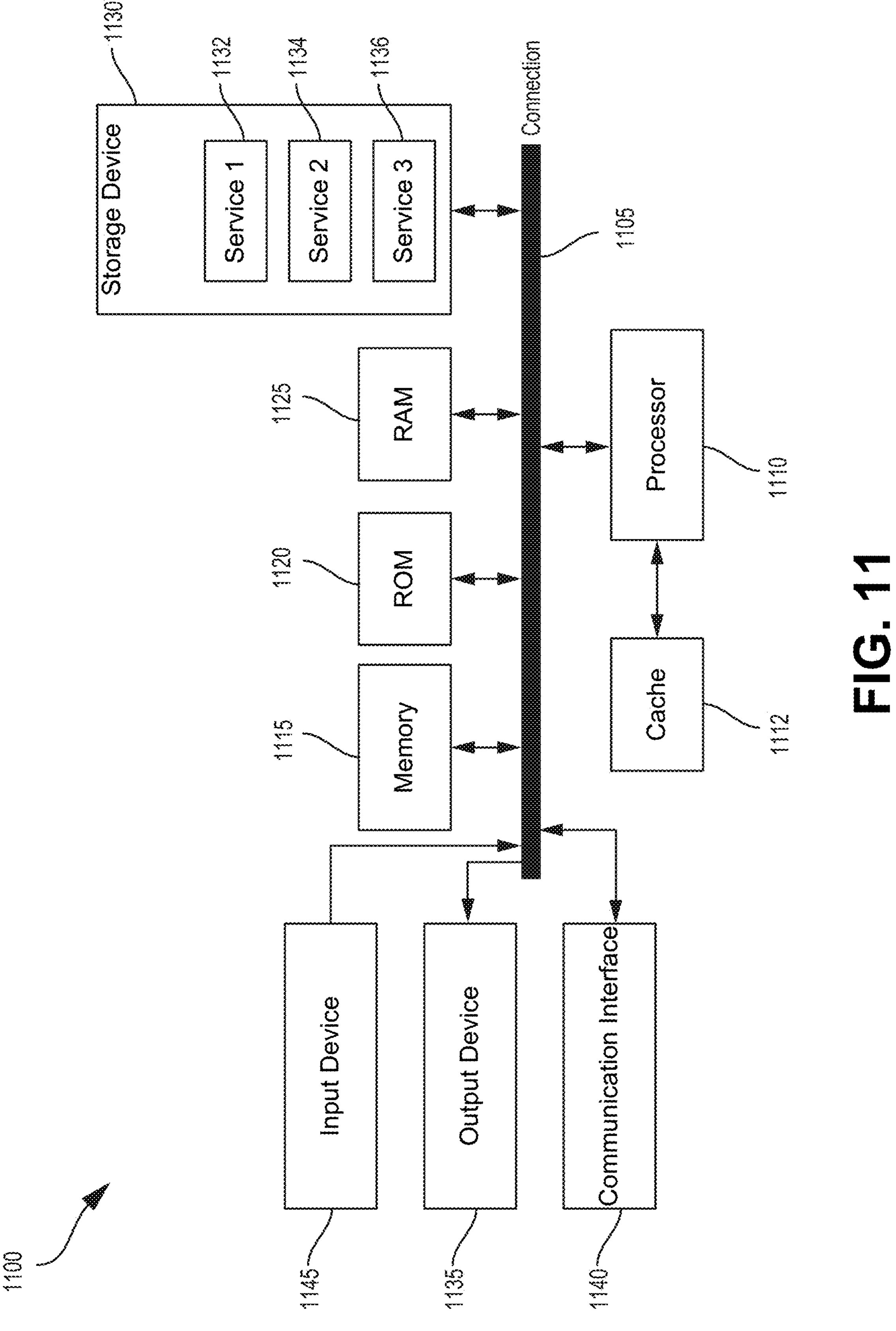
FIG. 11 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered as I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
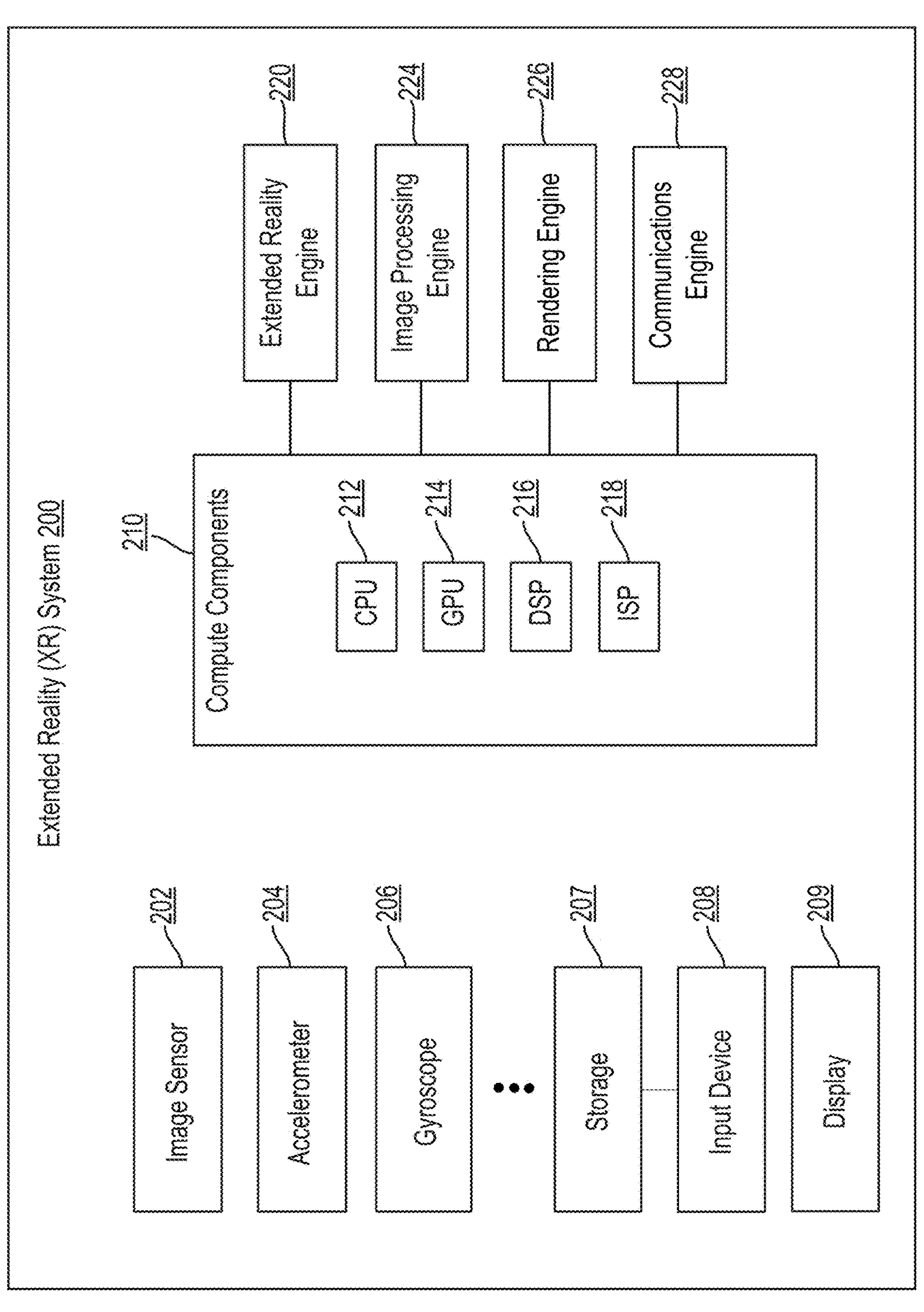
FIG. 2 is a diagram illustrating an architecture of an example extended reality (XR) system, in accordance with some aspects of the disclosure.

FIG. 2 is a diagram illustrating an architecture of an example extended reality (XR) system 200, in accordance with some aspects of the disclosure. In some examples, the extended reality (XR) system 200 of FIG. 2 can include the image capture and processing system 100, the image capture device 105A, the image processing device 105B, or a combination thereof. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one or more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1140 of FIG. 11.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3A:
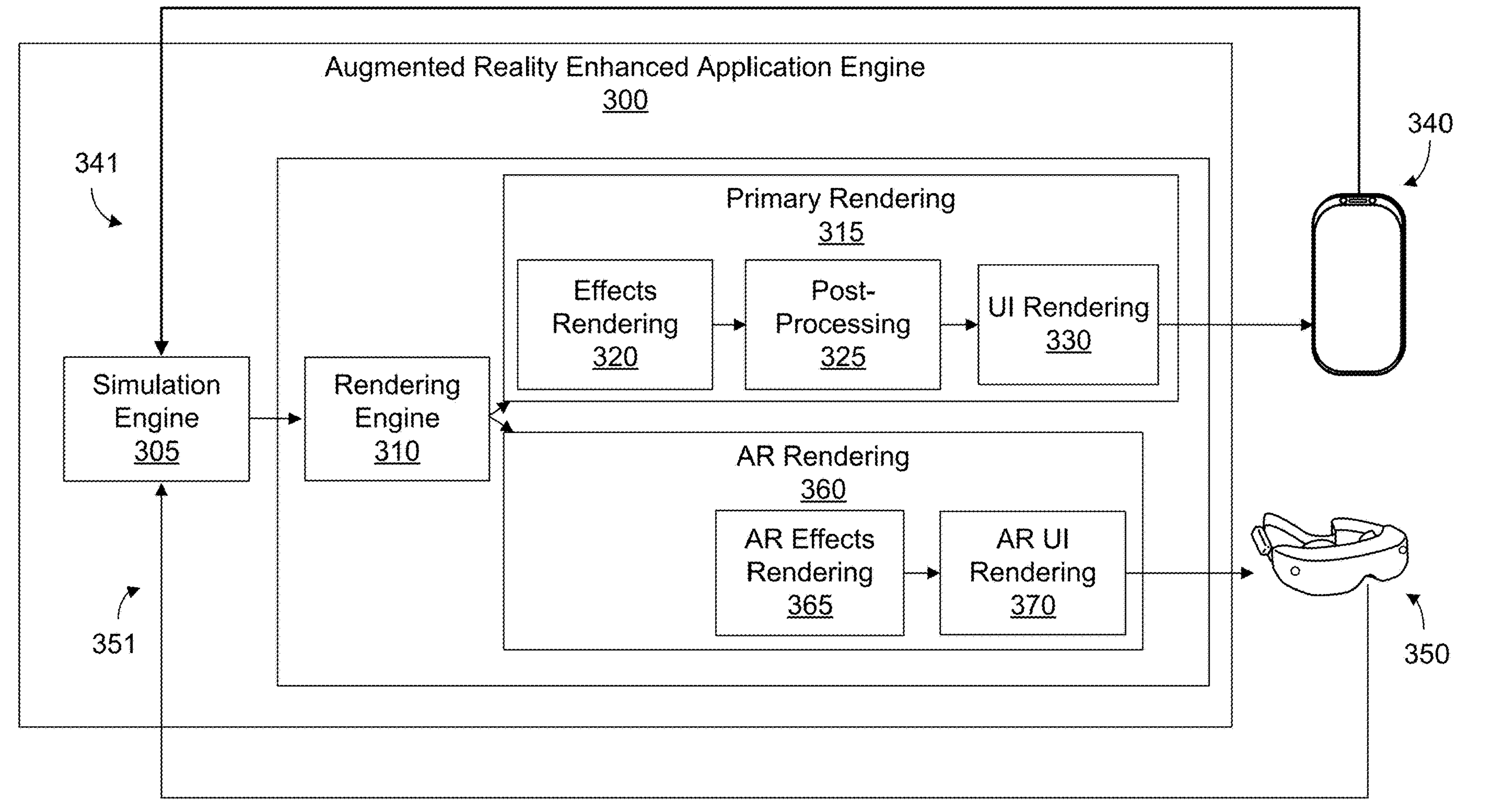
FIG. 3A illustrates an example of an augmented reality enhanced application engine, in accordance with aspects of the present disclosure.

FIG. 3A illustrates an example of an augmented reality enhanced application engine 300, in accordance with aspects of the present disclosure. In some cases, the augmented reality enhanced application engine 300 may be implemented as a part of the XR engine 220 of FIG. 2. In the illustrative example, the augmented reality enhanced application engine 300 includes a simulation engine 305, a rendering engine 310, a primary rendering module 315, and AR rendering module 360. As illustrated, the primary rendering module 315 can include an effects rendering engine 320, a post-processing engine 325, and a user interface (UI) rendering engine 330. The AR rendering module 360 can include an AR effects rendering engine 365 and an AR UI rendering engine 370. It should be noted that the components 305-370 shown in FIG. 3A are non-limiting examples provided for illustrative and explanation purposes, and other examples can include more, fewer, or different components than those shown in FIG. 3A.

In some cases, the augmented reality enhanced application engine 300 is included in and/or is in communication with (wired or wirelessly) an electronic device 340. In some examples, the augmented reality enhanced application engine 300 is included in and/or is in communication with (wired or wirelessly) an XR system 350.

In the illustrated example of FIG. 3A, the simulation engine 305 can generate a simulation for the augmented reality enhanced application engine 300. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the simulation generated by the simulation engine 305 can be dynamic. For example, the simulation engine 305 can update the simulation based on different triggers, including, without limitation, physical contact, sounds, gestures, input signals, passage of time, and/or any combination thereof. As used herein, an application state of the augmented reality enhanced application engine 300 can include any information associated with the simulation engine 305, rendering engine 310, primary rendering module 315, effects rendering engine 320, post-processing engine 325, UI rendering engine 330, AR rendering module 360, AR effects rendering engine 365, AR UI rendering engine 370, inputs to the augmented reality enhanced application engine 300, outputs from the augmented reality enhanced application engine 300, and/or any combination thereof at a particular moment in time.

As illustrated, the simulation engine 305 can obtain mobile device input 341 from the mobile device 340. In some cases, the simulation engine 305 can obtain XR system input 351 from the XR system 350. The mobile device input 341 and/or XR system input 351 can include, for example, user input through a user interface of the application displayed on the display of the mobile device 340, user inputs from an input device (e.g., input device 208 of FIG. 2), one or more sensors (e.g., image sensor 202, accelerometer 204, gyroscope 206 of FIG. 2). In some cases, simulation engine 305 can update the application state for the augmented reality enhanced application engine 300 based on the mobile device input 341, XR system input 351, and/or any combination thereof.

In the illustrative example of FIG. 3A, the rendering engine 310 can obtain application state information from the simulation engine 305. In some cases, the rendering engine 310 can determine portions of the application state information to be rendered by the displays available to the augmented reality enhanced application engine 300. For example, the rendering engine 310 can determine whether a connection (wired or wireless) has been established between the XR system 350 and the mobile device 340. In some cases, the rendering engine 310 can determine the application state information to be rendered by the primary rendering module 315 and the AR rendering module 360. In some cases, the rendering engine 310 can determine that the XR system 350 is not connected (wired or wirelessly) to the mobile device 340. In some cases, the rendering engine 310 can determine the application state information for the primary rendering module 315 and forego determining application state information to be rendered by the AR rendering module 360 that will not be displayed. Accordingly, the rendering engine 310 can facilitate an adaptive rendering configuration for the augmented reality enhanced application engine 300 based on the availability and/or types of available displays. In some implementations, a separate rendering engine 310 as shown in FIG. 3A may be excluded. In one illustrative example, the primary rendering module 315 and/or AR rendering module 360 can include at least a portion of the functionality of the rendering engine 310 described above.

The primary rendering module 315 can include an effects rendering engine 320, post-processing engine 325, and UI rendering engine 330. In some cases, the primary rendering module 315 can render image frames configured for display on a display of the mobile device 340. As illustrated, the primary rendering module 315 can output the generated image frames (e.g., media content) to be displayed on a display of the mobile device 340. In some cases, effects rendering information can be used to render application state information generated by the simulation engine 305. For example, the effects rendering engine can generate a 2D projection of a portion of a 3D environment included in the application state information. For example, the effects rendering engine 320 may generate a perspective projection of the 3D environment by a virtual camera. In some cases, the application state information can include a pose of the virtual camera within the environment. In some cases, the effects rendering engine 320 can generate additional visual effects that are not included within the 3D environment. For example, the effects rendering engine 320 can apply texture maps to enhance the visual appearance of the effects generated by the effects rendering engine 320. In some cases, the effects rendering engine 320 can exclude portions of the application state information designated for the AR rendering module 360 by the rendering engine 310. For example, the primary rendering module 315 may exclude effects present in the environment of the simulation.

In some cases, post-processing engine 325 can provide additional processing to the rendered effects generated by the effects rendering engine 320. For example, the post-processing engine 325 can perform scaling, image smoothing, z-buffering, contrast enhancement, gamma, color mapping, any other image processing, and/or any combination thereof.

In some implementations, UI rendering engine 330 can render a UI. In some cases, the user interface can provide application state information in addition to the effects rendered based on the application environment (e.g., a 3D environment). In some cases, the UI can be generated as an overlay over a portion of the image frame output by the post-processing engine 325.

The AR rendering module 360 can include an AR effects rendering engine 365, an AR UI rendering engine 370. In some cases, the AR effects rendering engine 365 can render application state information generated by the simulation engine 305. For example, the AR effects rendering engine 365 can generate a 2D projection of a 3D environment included in the application state information. In some cases, the AR effects rendering engine 365 can generate effects that appear to protrude out from the display surface of the display of the mobile device 340.

In some cases, the display of the XR system 350 can have different display parameters (e.g., a different resolution, frame rate, aspect ratio, and/or any other display parameters) than the display of the mobile device 340. In some cases, the display parameters can also vary between different types of output devices (e.g., different HMD models, other XR systems, or the like). As a result, rendering display data for the 350 with the AR rendering module 360 can affect performance of the primary rendering module 315 (e.g., by consuming computational resources of a GPU, CPU, memory, or the like). In some cases, inclusion of the AR rendering module 360 within the augmented reality enhanced application engine 300 can require periodic updates to provide compatibility with different devices.

As indicated above, in some cases, an XR system may track physical objects, such as parts of the user, to allow the user to interact with virtual content, such as virtual objects. As an example, the XR system may use one or more cameras (e.g., image sensor 130 of FIG. 1, image sensor 202 of FIG. 2, and the like) to track a hand of the user via one or more landmarks of the hands (e.g., physical object).

Figure 3B:
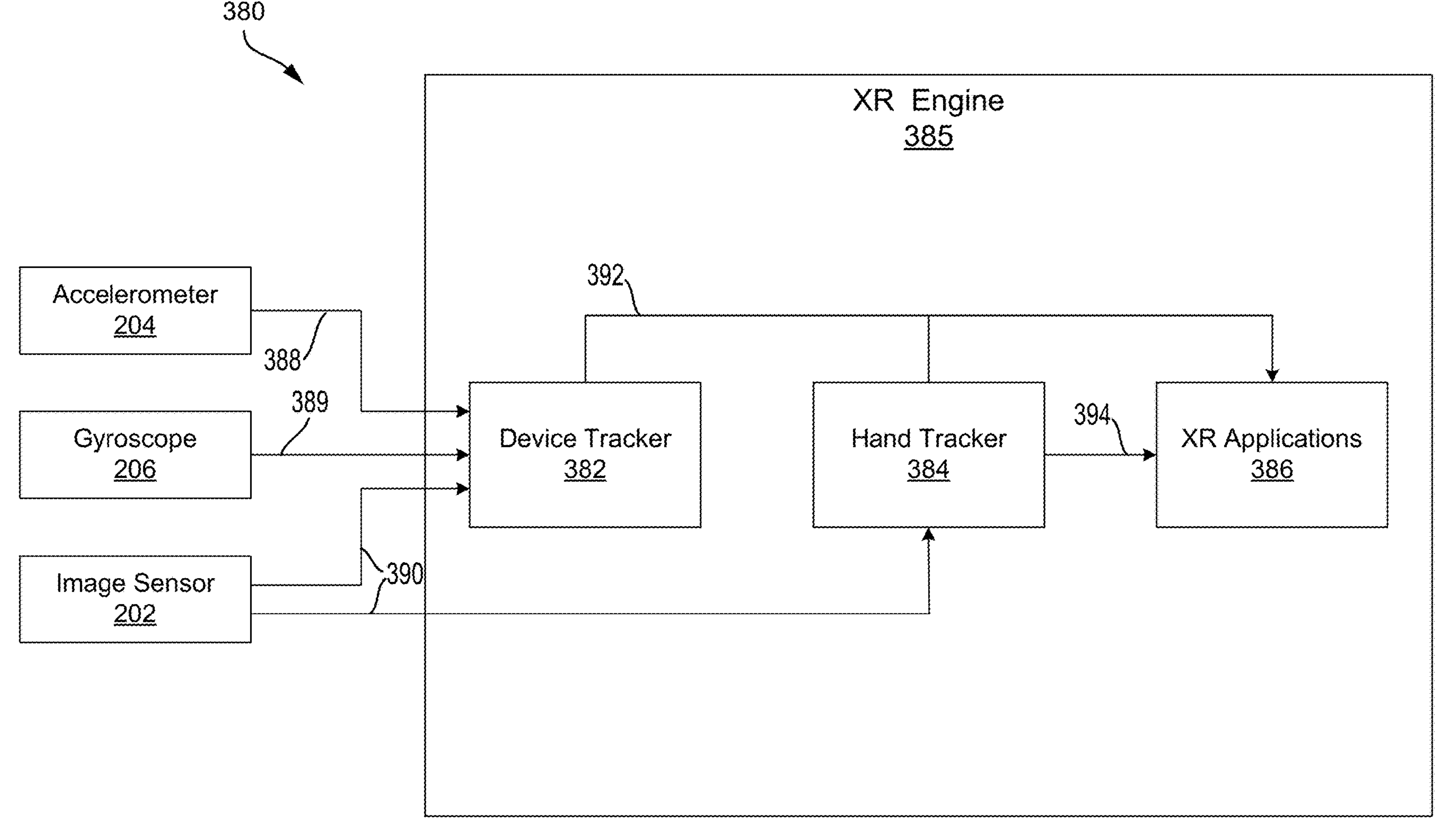
FIG. 3B is a block diagram illustrating an example system for hand tracking, in accordance with aspects of the present disclosure.

FIG. 3B is a block diagram illustrating an example system for hand tracking 380, in accordance with aspects of the present disclosure. In FIG. 3B, a device tracker 382 can receive measurements 388 from an accelerometer 204, measurements 389 from a gyroscope 206, and image data 390 from image sensor 202 (e.g., image sensor 202 of FIG. 2). In some examples, the measurements 388 may include motion measurements from the accelerometer 204 (e.g., accelerometer 204 of FIG. 2) and the measurements 389 may include orientation measurements from the gyroscope 206 (e.g., gyroscope 206 of FIG. 2). For example, the measurements 388 can include one or more translational vectors (e.g., up/down, left/right, forward/back) from the accelerometer 204 and the measurements 388 can include one or more rotational vectors (e.g., pitch, yaw, roll) from the gyroscope 206. Moreover, the image data 390 can include one or more images or frames captured by the image sensor 202 (e.g., image sensor 202 of FIG. 2). The one or more images or frames can capture a scene associated with the XR system and/or one or more portions of the scene (e.g., one or more regions, objects, humans, etc.).

In some examples, the device tracker 382 may be implemented as a part of an XR engine 385 (e.g., XR engine 220 of FIG. 2) of an extended reality system. In other cases, the device tracker 382 can be separate from the XR engine 385 and implemented by one or more of the compute components on the XR system.

The device tracker 382 may use the measurements 388, 389 and image data 390 to track a pose (e.g., a 6 DOF pose) of the extended reality system. For example, the device tracker 382 may fuse visual data from the image data 390 with inertial data (e.g., motion data, orientation data, etc.) from the measurements 388, 389 to determine a position and motion of the extended reality system relative to the physical world (e.g., the scene) and a map of the physical world. In some examples, when tracking the pose of the extended reality system, the device tracker 382 can generate a three-dimensional (3D) map of the scene (e.g., the real world) and/or generate updates for a 3D map of the scene. The 3D map updates can include, for example and without limitation, new or updated features and/or landmark points associated with the scene and/or the 3D map of the scene, localization updates identifying or updating a position of the extended reality system within the scene and the 3D map of the scene, etc. The 3D map can provide a digital representation of a scene in the real/physical world. In some examples, the 3D map can anchor location-based objects and/or content to real-world coordinates and/or objects. The extended reality system can use a mapped scene (e.g., a scene in the physical world represented by, and/or associated with, a 3D map) to merge the physical and virtual worlds and/or merge virtual content or objects with the physical environment.

The device tracker 382 may provide tracking data 392 generated from the measurements 388 and the image data 390 to a hand tracker 384, and a set of XR applications 386. The tracking data 392 may include the pose of the XR system and map data calculated by the device tracker 382. The map data can include a 3D map of the scene and/or map updates for a 3D map of the scene, as previously described.

In some cases, the hand tracker 384 may be included as a component of the XR engine 385. In some cases, the hand tracker 384 may be implemented by an XR system to track a hand (e.g., hand 426 of FIG. 4) of the user associated with the XR system and/or fingertips in the hand of the user, as previously explained. For simplicity and explanation purposes, the hand tracker 384 will be described herein as a component for tracking hands. However, it should be noted that, in other examples, the hand tracker 384 may track other objects and/or body parts. For example, as previously noted, the hand tracker 384 may track fingers or fingertips on a hand either in addition to, or instead of, tracking the hand itself.

In some examples, the hand tracker 384 can be part of, or implemented by, the XR engine 385 on the XR system. In other examples, the hand tracker 384 may be separate from the XR engine 385 and implemented by one or more of the compute components on the XR system.

The hand tracker 384 may also receive the image data 390 from the image sensor 202. The hand tracker 384 may use the image data 390 and the tracking data 392 to track a hand pose 394 (e.g., a pose of the hand and/or fingers/fingertips of the hand). In some examples, the hand tracker 384 can determine the hand pose 394 based on landmark points of the hand. The hand tracker 384 can then provide the hand pose 394 to one or more XR application 386. In some examples, the XR applications 386 can be an application on the XR system designed and/or configured to provide a particular XR experience. In some cases, an AR engine, such as the augmented reality enhanced application engine 300, may be an XR application 386. The XR applications 386 may also include higher level applications, for example, an AR gaming experience, an AR classroom experience, and/or any other XR experiences. The XR applications 386 may be a part of, or implemented by, the XR engine 385 or can be separate from the XR engine 385.

Figure 4:
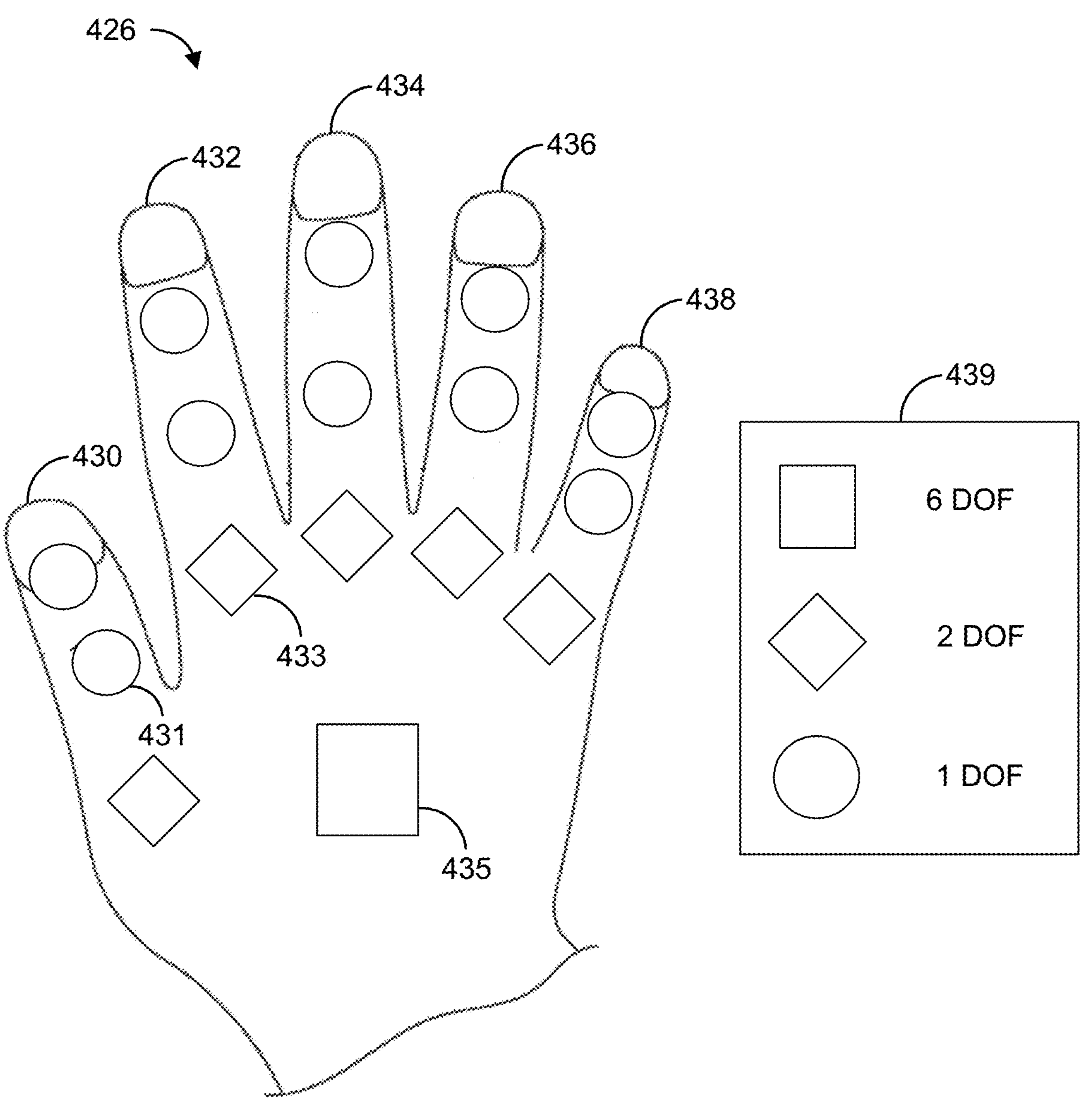
FIG. 4 is a diagram illustrating an example of landmark points of a hand, in accordance with aspects of the present disclosure.

FIG. 4 is a diagram illustrating an example of landmark points of a hand 426, in accordance with aspects of the present disclosure. The landmark points shown in FIG. 4 correspond to different parts of the hand 426, including a landmark point 435 on the palm of the hand, three landmark points on the thumb 430 of the hand 426, three landmark points on the index finger 432 of the hand 426, three landmark points on the middle finger 434 of the hand 426, three landmark points on the ring finger 436 of the hand 426, and three landmark points on the pinky 438 of the hand 426. The palm of the hand 426 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6 DOF) that can be used for registration and/or tracking. The 6 DOF movement of the palm is illustrated as a square in FIG. 4, as indicated in the legend 439.

The different joints of the fingers of the hand 426 allow for different degrees of movement, as illustrated in the legend 439. As illustrated by the diamond shapes (e.g., diamond 433) in FIG. 4, the base of each finger (corresponding to the metacarpophalangeal joint (MCP) between the proximal phalanx and the metacarpal) has two degrees of freedom (2 DOF) corresponding to flexion and extension as well as abduction and adduction. As illustrated by the circle shapes (e.g., circle 431) in FIG. 4, each of the upper joints of each finger (corresponding to the interphalangeal joints between the distal, middle, and proximal phalanges) has one degree of freedom (1 DOF) corresponding to flexion and extension.

In some cases, the XR system may use one or more of the landmark points on the hand 426 to track the hand 426 (e.g., track a pose and/or movement of the hand 426) and track interactions with a virtual interface rendered by the XR system. As noted above, as a result of the detection of the one or more landmark points on the hand 426, the pose of the landmark points (and thus the hand and fingers) in relative physical position with respect to the XR system can be established. For example, the landmark points on the palms of the hand 426 (e.g., the landmark point 435) can be detected in an image, and the locations of the landmark points can be determined with respect to an image sensor of the XR system. A point of a virtual interface (e.g., a center point, such as a center of mass or other center point) rendered by the XR system and/or an interface element on the virtual interface selected by the hand 426, or with which the hand 426 has interacted, can be translated to a position on a display (or a rendering on the display) of the XR system relative to the locations determined for the landmark points on the palms of the hand 426. In some examples, a point of a portion of the virtual interface with which the hand 426 has interacted with can be registered relative to locations of one or more landmark points on the hand 426.

In some examples, the XR system can also register the virtual interface and/or the hand 426 to points in the real world (as detected in one or more images) and/or to other parts of the user. For instance, in some implementations, in addition to determining a physical pose of the hand 426 with respect to the XR system and/or a virtual interface, the XR system can determine the location of other landmarks, such as distinctive points (referred to as key points) on walls, one or more corners of objects, features on a floor, points on a human face, points on nearby devices, among others. In some cases, the XR system can place the virtual interface within a certain position with respect to key points detected in the environment, which can correspond to, for example, detected objects and/or humans in the environment.

FIG. 5 illustrates an example scene 500 for an XR system, in accordance with aspects of the present disclosure. In some examples, scene 500 may be simulated, for example, by the simulation engine 305 of FIG. 3A. The scene 500 includes multiple 3D objects on a virtual desk 502 object. In some examples, the 3D objects may represent various virtual elements including applications that may be executed by the XR system. In some cases, the 3D objects may be interactive and may be moved around. For example, in scene 500, multiple 3D objects have been placed on the virtual desk 502 and arranged into clusters of 3D objects. The clusters of 3D (e.g., virtual) objects may include at least two virtual objects. These virtual objects may be "independent" virtual objects, in that the virtual objects cannot be combined into (or a part of) a single virtual object. As an example, on the virtual desk 502, the 3D objects may be arranged into a first cluster 504 of 3D objects on a right side of the virtual desk, a second cluster 506 of 3D objects on a left side of the virtual desk, and a third cluster 508 of 3D objects in a middle portion towards a back of the virtual desk 502.

In some cases, when there are multiple 3D objects clustered in a relatively small region, there may be a level of ambiguity involved in an attempt to interact with a 3D object of the cluster of 3D objects. As an example, if an object that is interfacing with the XR system (e.g., interfacing object), such as a tracked arm 510 (e.g., of a user) moves toward a cluster of 3D objects, such as the first cluster 504, and attempts to grab (e.g., touch, move, select, or the like) a 3D object to select the 3D object, it may be ambiguous which 3D object of the first cluster 504 is being selected. For example, the user may be attempting to grab a cylinder object 520, but instead may grab a ball object 522. In some cases, this ambiguity may be resolved based on a pose of a part of the interfacing object, such as a hand of the tracked arm 510.

Users in an XR environment may interact with 3D virtual objects of a certain shape in a manner similar to how they may interact with a real object having a corresponding shape in the real environment. In some cases, when reaching for (e.g., moving towards) a target object (virtual or real) of a certain shape and/or size, an interfacing object, such as an arm and/or hand, may have a different pose as compared to reaching for another target object of a different shape and/or size. Thus, an initial pose of a hand (e.g., initial hand pose) when reaching for a cylinder object 520 in the XR environment may be similar to the initial pose of a hand when reaching for a similar cylinder-shaped object in the real environment. As another example, the initial hand pose when reaching for the cylinder object 520 may differ from the initial hand pose when reaching for another object, such as the ball object 522. In some examples, the initial hand pose may differ when reaching for a smaller object, as compared to a larger object. For example, the initial hand pose may differ when reaching for the small square object 524 as compared to the relatively larger ball object 522. In some cases, the initial hand pose when reaching towards a cluster of objects may be mapped against a set of initial postures. In some cases, a posture may refer to a mapped pose (e.g., initial posture, final posture, etc.) of an interfacing object, such as the tracked arm 510 or a hand of the tracked arm 510.

FIG. 6A illustrates a set of initial hand postures 600, in accordance with aspects of the present disclosure. In some cases, as an interfacing object, such as a hand, is moving towards a cluster of objects, the pose of the hand may be obtained and matched against the set of initial hand postures. Matching the pose of the hand against the set of initial hand postures may be performed by any algorithm for matching, examples of which include K nearest neighbors, support vector machines, decision trees, convolution neural networks, any combination thereof, and/or other matching technique. In some cases, the set of initial hand postures 600 may be stored on the XR system and virtual 3D objects that may be interacted with (e.g., may be used as a target object) may be associated with an initial hand posture of the set of initial hand postures 600. For example, a first initial hand posture 602 may be associated with the cylinder object 520 of FIG. 5, a second initial hand posture 604 may be associated with the small square object 524 of FIG. 5 and a pen object 526 of FIG. 5, and a third initial hand posture 606 may be associated with the ball object 522 of FIG. 5, a camera object 528 of FIG. 5, and a notepad object 530 of FIG. 5. In some cases, a virtual 3D object may be associated with multiple initial hand postures of the set of initial hand postures.

In some cases, an initial hand posture, of a set of initial hand postures, may be associated with a certain virtual 3D object by a creator of the virtual 3D object using, for example machine learning techniques, trial and error, experimentation, and the like. In other cases, the set of initial hand postures may be determined for an existing virtual 3D object. For example, a mesh of the 3D object may be analyzed, for example, by a machine learning model to determine an initial hand posture associated with the 3D object. In some cases, a certain virtual 3D object may be associated with an initial posture of multiple interfacing objects, such as two hands. In some cases, the initial posture of the interfacing object (e.g., initial hand posture), may be used to narrow down objects from the cluster of objects. For example, the initial hand posture may be used to identify one or more initial objects (e.g., a set of initial objects), from the cluster of objects.

In some cases, to interact with the target object being selected, the initial posture of the interfacing object (e.g., hand) may be changed to a pose corresponding to a final posture when actually interacting the target object. For example, fingers of a hand object may tighten around the target object, such as the cylinder object 520 of FIG. 5, or the fingers may be rotated/move as if to slide under a flat target object, such as the notepad object 530 of FIG. 5.

FIG. 6B illustrates a set of final hand postures 650, in accordance with aspects of the present disclosure. In some cases, after an initial posture is determined for interfacing with an object, updated pose information may be received. For example, user's hand pose may change when a reaching hand reaches the target object. This changed hand pose may be detected as updated pose information. This updated pose information may be used to determine a final posture (e.g., final hand posture) for the interfacing object. In some cases, processes of one or more applications may be preloaded during a time period (e.g., a time gap) between when the initial posture is determined and when the final hand posture is determined. In some cases, the set of final hand postures 650 may be stored on the XR system and virtual 3D objects that may be interacted with (e.g., may be used as a target object) may be associated with a final hand posture of the set of final hand postures 650. In this example a first final hand posture 652 may be associated with the notepad object 530 of FIG. 5, a second final hand posture 654 may be associated with the cylinder object 520 of FIG. 5, and so forth. In some cases, a final hand posture, of a set of final hand postures, may be associated with a certain virtual 3D object by a creator of the virtual 3D object using, for example machine learning techniques, trial and error, experimentation, and the like.

Figure 7:
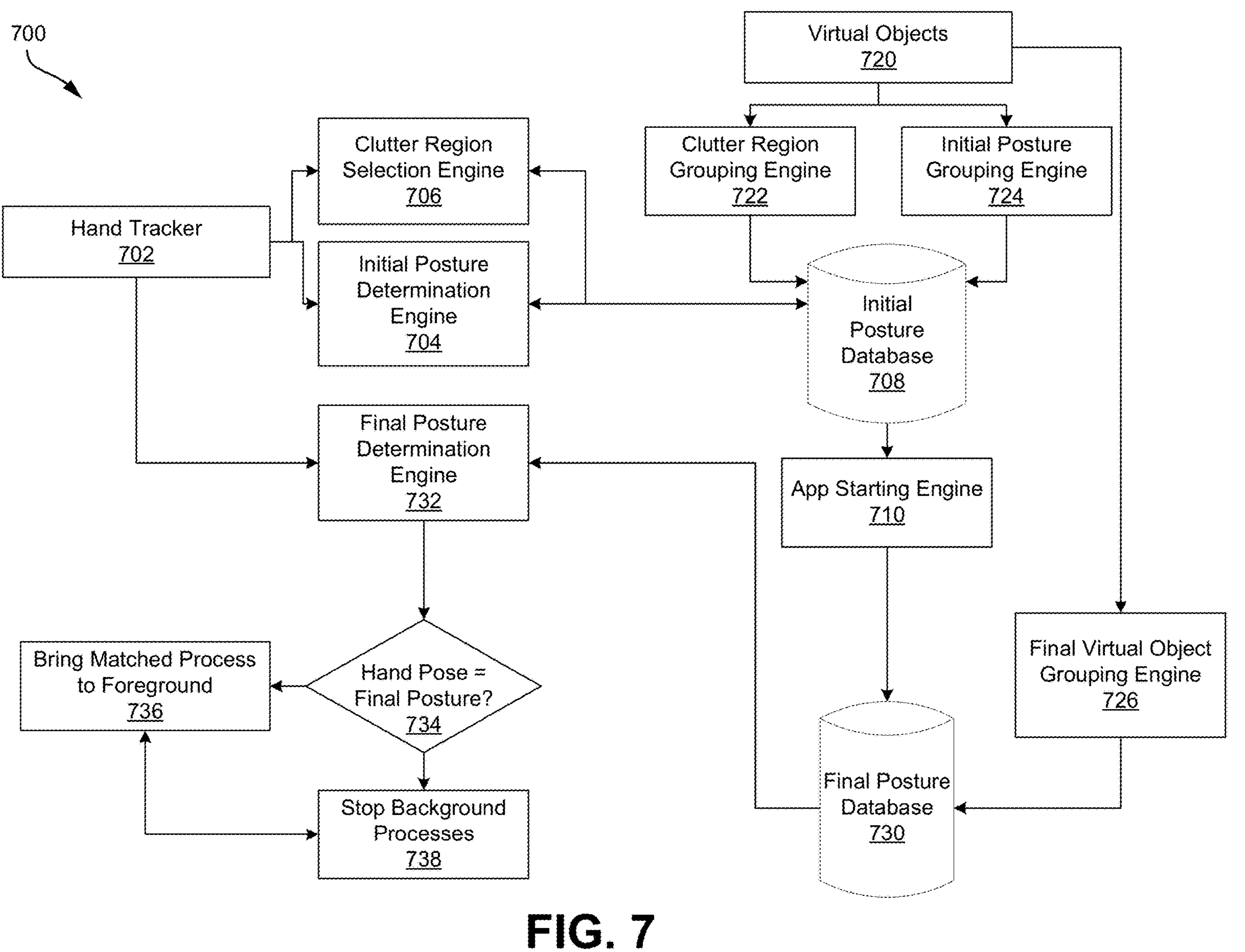
FIG. 7 is block diagram illustrating a technique for ambiguity resolution for object selection, in accordance with aspects of the present disclosure.

FIG. 7 is block diagram 700 illustrating a technique for ambiguity resolution for object selection, in accordance with aspects of the present disclosure. In some cases, an application implementing techniques for ambiguity resolution may be included in an XR application, such as XR applications 386 of FIG. 3B. In some cases, an XR system may include object tracking, such as arm and/or hand tracking, to provide a variety of functionality. One example of such functionality may include user input. In this example, hand tracking information may be output by a hand (e.g., object) tracker 702. In some cases, the hand tracking information output by the hand tracker 702 may include pose information about a tracked hand. This pose information may be input to an initial posture determination engine 704. The initial posture determination engine 704 may receive the pose information about a tracked hand and attempt to match the received pose information to a set of initial hand postures (e.g., initial hand postures 600 of FIG. 6A, or a set of expected hand postures). In some cases, the initial posture determination engine 704 may use any technique to match the pose information to an initial hand posture, such as machine learning techniques, nearest neighbor matching, etc. If a match between the pose information and an initial hand posture is determined, the initial posture determination engine 704 may send an indication of the matched initial hand posture for the tracked hand to an initial posture database 708. In some cases, the initial posture database 708 may include one or more lookup tables indicating virtual objects included in clutter regions of the virtual environment.

In some cases, the hand tracker 702 may also output direction information about the tracked hand to a clutter region selection engine 706. The direction information may be a directional vector indicating a direction the hand is moving in. The clutter region may obtain information about clutter regions from the initial posture database 708. The information about the clutter regions may indicate where clutter regions (e.g., clusters 506, 508, and 504 of FIG. 5) are located. Based on the direction information for the tracked hand and the information about the clutter regions, the clutter region selection engine 706 may determine whether the tracked hand is moving towards a clutter region. In some cases, the clutter region selection engine 706 may determine that the tracked hand is moving towards a clutter region based on proximity. For example, if the tracked hand is relatively close to a clutter region, the clutter region selection engine 706 may determine that the tracked hand is moving towards the clutter region. If the tracked hand is determined to be moving towards a particular clutter region, the clutter region selection engine 706 may send an indication of the particular clutter region the tracked hand is moving toward to the initial posture database 708.

As indicated above, virtual object that may be interacted with may be associated with an initial hand posture from a set of initial hand postures and a final hand posture from a set of final hand postures. In some examples, the initial posture database 708 may receive the indication of the matched initial hand posture and the indication of the particular clutter region the tracked hand is moving and the initial posture database 708 may determine whether the particular clutter region includes at least one virtual object that is associated with the matched initial hand posture.

In some cases, information about the virtual objects 720 in a virtual environment may be received, for example, from the XR system. The information about the virtual objects 720 in the virtual environment may include location information for the virtual objects 720. The indication of the virtual objects 720 may be input to a clutter region grouping engine 722 and an initial posture grouping engine 724. In some cases, the clutter region grouping engine 722 may group the virtual objects into distinct clutter regions based on the positions of the virtual objects 720. For example, the clutter region grouping engine 722 may use a clustering algorithm to group the virtual objects into clutter regions.

Grouping the virtual objects into clutter regions may be performed by any clustering algorithm. One illustrative example of such a clustering algorithm includes K-means clustering algorithm. The clutter regions may then be output to the initial posture database 708 for storage. In some cases, grouping the virtual objects into clutter regions may be performed when virtual objects are placed in the virtual environment. In some cases, placement of the virtual objects in the virtual environment may be separate from and performed before ambiguity resolution for object selection is performed.

In some examples, the initial posture grouping engine 724 may obtain the initial hand postures (e.g., from the information about the virtual objects) associated with the virtual objects and group the virtual objects into initial posture groups. In some cases, the initial posture groups may be determined based on the initial hand postures associated with the virtual objects. In some cases, the initial posture groups may be determined based on a shape and/or size of the virtual objects. The initial posture groups may then be output to the initial posture database 708 for storage. In some cases, grouping the virtual objects into initial posture groups may also be performed when virtual objects are placed in the virtual environment.

If the initial posture database 708 determines that the particular clutter region includes at least one virtual object that is associated with the matched initial hand posture, the initial posture database 708 may output predicted set of virtual objects to an application starting engine 710. The predicted set of virtual objects may include an indication of the at least one virtual object and/or at least one associated application of the at least one virtual object. In cases where the initial posture database 708 determines that the particular clutter region does not include at least one virtual object that is associated with the matched initial hand posture, the initial posture database 708 may not output the predicted set of objects. In some cases, the predicted set of objects may include a listing of applications associated with the virtual objects in the predicted set of virtual objects.

In some cases, the application starting engine 710 may attempt to preload (e.g., launch, activate, start running, etc.) the applications indicated in the predicted set of virtual objects received from the initial posture database 708. For example, the application starting engine 710 may query the initial posture database 708 to obtain the predicted set of virtual objects and preload the indicated applications corresponding to virtual objects of the predicted set of virtual objects in a background (e.g., by the XR system). In some examples, the application starting engine 710 may preload the indicated applications during a time period after the initial hand postures are determined and before final hand postures are determined. In some cases, to preload an application in the background, the application starting engine 710 (or the XR system) may start loading processes of the application, such as libraries (e.g., dynamic link libraries), used by the applications and/or other processes for starting an application which may not show a user interface of the application. For example, the application may be started as a background application where the user interface of the application is not shown or not currently actively being shown. In some cases, when multiple applications are preloaded (e.g., multiple indicated applications), one application, of the multiple applications, may be loaded in a foreground (e.g., where the user interface of the application is shown), while the other applications are preloaded in the background. In some cases, the application loaded in the foreground may be randomly chosen from among the multiple applications. In some examples, where a single application is indicated, that application may be preloaded in the foreground. In some cases, the application loaded in the foreground may be chosen based on which virtual object is closest to the tracked hand. For example, the application loaded in the foreground may be based on a comparison of a first distance from the tracked object to a first virtual object and a second distance from the tracked object to a second virtual object. The virtual object associated with the shortest distance may be preloaded in the foreground. In some examples, the application loaded in the foreground may be chosen based on the direction the tracked hand is moving. In some cases, loading an application in the foreground may occur if the tracked hand is within a distance threshold of the clutter region or virtual objects of the clutter region.

In some examples, an indication of the preloaded application(s) and/or corresponding virtual objects may be passed to a final posture database 730 by the application starting engine 710. In cases where an application is preloaded in the foreground, an indication of the preloaded application in the foreground may also be passed to a final posture database 730 by the application starting engine 710. In some cases, the predicted set of virtual objects may also be passed to the final posture database 730. In some cases, the final posture database 730 may include one or more lookup tables indicating application(s) that have been preloaded, the virtual objects associated with the preloaded application(s), and final hand postures associated with the preloaded applications.

As shown in FIG. 7, information about the virtual objects 720 in the virtual environment may be received by a final virtual object grouping engine 726. The final virtual object grouping engine 726 may obtain the final hand postures (e.g., from the information about the virtual objects) associated with the virtual objects (e.g., as shown in FIG. 6B) and group the virtual objects into final posture groups. The final virtual object grouping engine 726 may send information about the final posture groups to the final posture database 730 for storage. In some cases, grouping the virtual objects into final posture groups may also be performed when virtual objects are placed in the virtual environment.

As indicated above, the final posture database 730 may match the preloaded application(s), and/or corresponding virtual objects of the preloaded applications, with the final hand postures associated with the corresponding virtual objects. For example, the app starting engine 710 and/or final posture determination engine 732 may query the final posture database for the final hand postures corresponding to the virtual objects of the preloaded applications (or the predicted set of virtual objects). The final posture database 730 may send the final hand postures associated with the preloaded application(s) to the final posture determination engine 732.

The final posture determination engine 732 may receive the final hand postures associated with the preloaded application(s) from the final posture database 730 along with updated pose information about a tracked hand from the hand tracker 702. In some cases, as a hand continues to move toward an object after the initial hand posture is determined, updated pose information about the hand may be obtained by the hand tracker 702. As the hand approaches the intended object, the hand may assume a pose corresponding to a final hand posture. The updated pose information may be compared to final hand postures received from the final posture database 730 to determine whether the updated pose information matches a final hand posture. The final posture determination engine 732 may attempt to determine whether the received updated pose information from the hand tracker 702 matches with a final hand posture. Any matching final hand posture may be matched 734 against final postures from the final posture database 730. A match between the updated pose information and a final hand posture from the final posture database 730 may identify a virtual object selected by the tracked object (e.g., the hand). In some cases, the final posture determination engine 732 may attempt to match 734 the received updated pose information to the final hand postures in a manner similar to that discussed above with respect to the initial posture determination engine 704.

If the final posture determination engine 732 determines there is a match between the received updated pose information and a received final hand posture, the preloaded application (e.g., matched application) associated with the virtual object having a matching final hand posture may be brought to the foreground 736 (e.g., a user interface associated with the preloaded application may be shown) and the other applications that were preloaded in the background may be stopped 738. For example, if the application associated with the virtual object with the matching final hand posture is preloaded as a background process, the application may be brought to the foreground. To bring the application to the foreground, a user interface of the application may be shown. In cases where the matched application was preloaded in the foreground, the other applications that were preloaded in the background may be stopped 738. In cases where the matched application was preloaded in the background and another application was preloaded in the foreground, the matched application may be brought to the foreground 736 and the another application may be stopped 738.

In some examples, if the tracked hand moves away from the cluster of virtual objects, stops moving, the final hand posture does not match any of the final hand postures received from the final posture database 730, or otherwise indicates not to start the preloaded application(s), the preloaded background processes (e.g., applications) may be stopped 738. If an application was preloaded as a foreground process, the foreground process may also be stopped.

Figure 8:
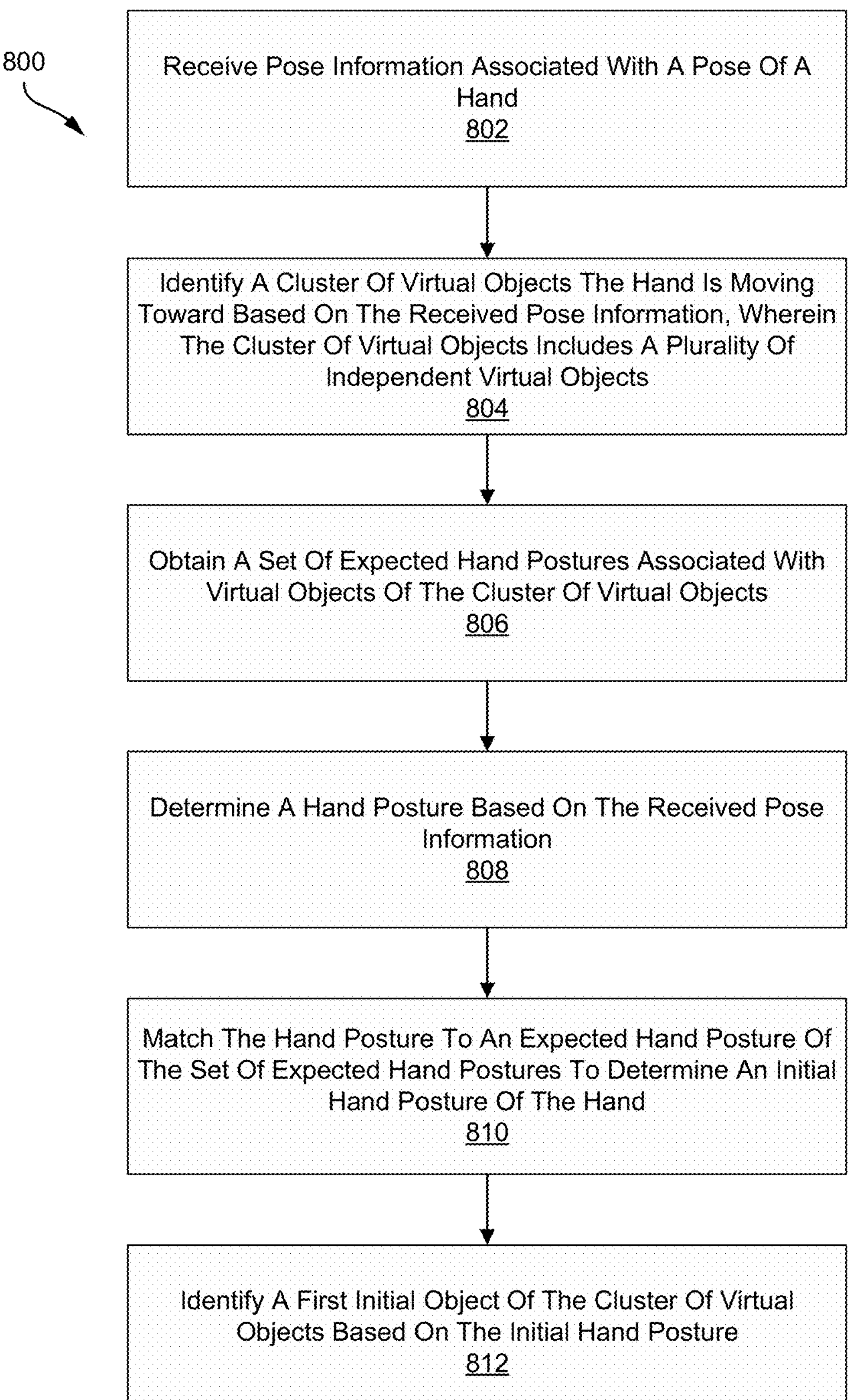
FIG. 8 is a flow diagram illustrating a technique for identifying an object, in accordance with aspects of the present disclosure.

FIG. 8 is a flow diagram illustrating a process 800 for pose prediction, in accordance with aspects of the present disclosure. The process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device, such as image capture and processing system 100 of FIG. 1, XR system 200 of FIG. 2, HMD 910 of FIGS. 9A and 9B, mobile handset 1050 of FIGS. 10A and 10B, computing system 1100 of FIG. 11, and the like. Examples of components of the computing device may include image processor 150, host processor 152 of FIG. 1, compute components 210 of FIG. 2, processor 1110 of FIG. 11, and the like. The operations of the process 800 may be implemented as software components that are executed and run on one or more processors.

At block 802, the computing device (or component thereof) may receive pose information associated with a pose of a hand (e.g., hand 426 of FIG. 4). In some aspects, the pose information may indicate a position and location information about the hand.

At block 804, the computing device (or component thereof) may identify a cluster of virtual objects the hand is moving toward (e.g., cluster 504 of FIG. 5) based on the received pose information, wherein the cluster of virtual objects includes a plurality of independent virtual objects (e.g., separate virtual objects).

At block 806, the computing device (or component thereof) may obtain a set of expected hand postures (e.g., initial hand postures 600 of FIG. 6) associated with virtual objects (e.g., virtual objects 520-530 of FIG. 5) of the cluster of virtual objects (e.g., clusters 506, 508, and 504 of FIG. 5). In some cases, the virtual objects are associated with a plurality of applications.

At block 808, the computing device (or component thereof) may determine a hand posture based on the received pose information. For example, an initial posture determination engine, such as initial posture determination engine 704 of FIG. 7, may receive the pose information about a tracked hand and attempt to match the received pose information to a set of initial hand postures.

At block 810, the computing device (or component thereof) may match the hand posture to an expected hand posture of the set of expected hand postures to determine an initial hand posture of the hand. For example, the received pose information may be matched against postures associated with virtual objects from an initial posture database, such as initial posture database 708 of FIG. 7.

At block 812, the computing device (or component thereof) may identify a first initial object of the cluster of virtual objects based on the initial hand posture. The computing device (or component thereof) may preload a first process of a first application of the plurality of applications. For example, the first application can be associated with the first initial object. In some cases, the first process is a preloaded as a background process. For example, processes of the application, such as libraries (e.g., dynamic link libraries), used by the applications and/or other processes for starting an application which do not show a user interface of the application may be preloaded the background (e.g., without showing a user interface or other indication the process is being preloaded).

In some cases, the computing device (or component thereof) may identify a second initial object of the cluster of virtual objects based on the initial hand posture, determine to preload the first process of the first application as a foreground process, preload the first process of the first application as the foreground process, and preload a second process of the second application, of the plurality of applications, as a background process. The second application may be associated with the second initial object. For example, where multiple virtual objects (and thus multiple applications) may be identified based on the initial hand posture, an application, of the multiple applications, may be preloaded in the foreground (e.g., process which may show a user interface or indication the application is being loaded may be preloaded), while other applications may be preloaded in the background. In some cases, the computing device (or component thereof) may preload the first process of the first application as a foreground process based on a comparison between a first distance between the hand and the first initial object and a second distance between the hand and the second initial object. For example, the virtual object having the shortest distance from the hand may be preloaded in the foreground. In some cases, a second process of a second application associated with the second initial object is preloaded as a background process. In some cases, the first process is preloaded between a time period between determining the initial hand posture and determining the final hand posture.

In some cases, the computing device (or component thereof) may identify a second initial object of the cluster of virtual objects based on the initial hand posture, the second initial object associated with a second application of the plurality of applications, preload a second process of the second application as a background process, determine that the selected virtual object is the second initial object, remove the preloaded first process, and bring the second application to a foreground. For example, an application starting engine, such as application starting engine 710, may preload multiple applications where one application is preloaded as a foreground application and other applications may be preloaded as background applications. Based on the final object selected, the application associated with the final object selected is loaded in the foreground and other preloaded applications stopped. In some cases, the computing device (or component thereof) may, receive updated pose information for the hand (e.g., from a hand tracker such as hand tracker 702 of FIG. 7); determine the final hand posture of the hand based on the updated pose information (e.g., by a final posture determination engine such as a final posture determination engine 732 of FIG. 7); and determine the final hand posture matches a posture associated with the second initial object.

In some cases, the computing device (or component thereof) may determine a predicted set of virtual objects based on the initial hand posture (where the first initial object is in the predicted set of virtual objects). In some cases, the computing device (or component thereof) may receive updated pose information for the hand. For example, as the hand continues to move, updated pose information may be obtained for the hand. In some cases, the computing device (or component thereof) may determine a final hand posture of the hand based on the updated pose information. For example, the hand may move into a final position to interact with a desired virtual object. In some cases, the computing device (or component thereof) may identify a selected virtual object based on the final hand posture of the hand. For example, the final hand pose may be matched against final postures associated with virtual objects from a final posture database, such as final posture database 730 of FIG. 7. In some cases, the selected virtual object is the first initial object, and the computing device (or component thereof) may bring the first application to a foreground. For example, a process which shows a UI associated with the first application may be loaded.

Figure 9A:
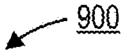
FIG. 9A is a perspective diagram illustrating a head-mounted display (HMD) that performs feature tracking and/or visual simultaneous localization and mapping (VSLAM), in accordance with some examples.
Figure 9A:
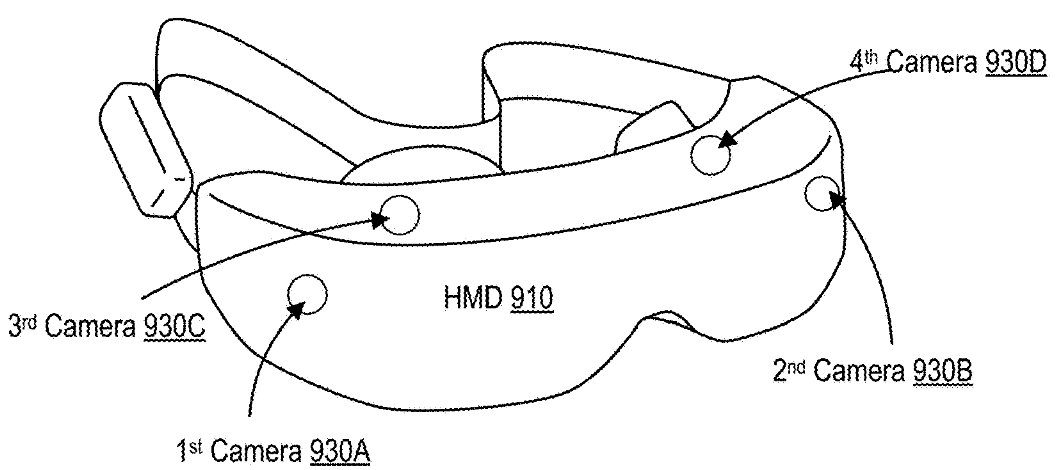

FIG. 9A is a perspective diagram 900 illustrating a head-mounted display (HMD) 910 that performs feature tracking and/or visual simultaneous localization and mapping (VSLAM), in accordance with some examples. The HMD 910 may be, for example, an augmented reality (AR) headset, a virtual reality (VR) headset, a mixed reality (MR) headset, an extended reality (XR) headset, or some combination thereof. The HMD 910 may be an example of an XR system 200. The HMD 910 includes a first camera 930A and a second camera 930B along a front portion of the HMD 910. In some cases, the HMD 910 may also include a third camera 930C, fourth camera 930D, fifth camera (not visible), and sixth camera (not visible). In some examples, the HMD 910 may only have a single camera. In some examples, the HMD 910 may include one or more additional cameras in addition to the first camera 930A and the second camera 930B. In some examples, the HMD 910 may include one or more additional sensors in addition to the first camera 930A and the second camera 930B.

Figure 9B:
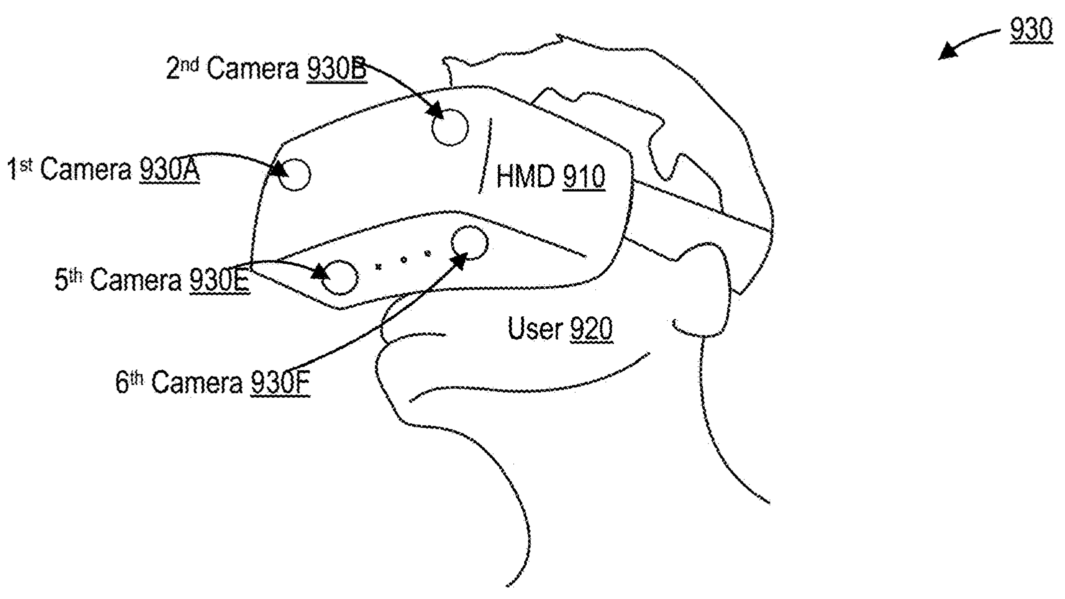
FIG. 9B is a perspective diagram illustrating a head-mounted display (HMD) being worn by a user, in accordance with some examples.

FIG. 9B is a perspective diagram 930 illustrating the head-mounted display (HMD) 910 of FIG. 9A being worn by a user 920, in accordance with some examples. The user 920 wears the HMD 910 on the user 920's head over the user 920's eyes. The HMD 910 can capture images with the first camera 930A and the second camera 930B. In some examples, the HMD 910 displays one or more display images toward the user 920's eyes that are based on the images captured by the first camera 930A and the second camera 930B. The display images may provide a stereoscopic view of the environment, in some cases with information overlaid and/or with other modifications. For example, the HMD 910 can display a first display image to the user 920's right eye, the first display image based on an image captured by the first camera 930A. The HMD 910 can display a second display image to the user 920's left eye, the second display image based on an image captured by the second camera 930B. For instance, the HMD 910 may provide overlaid information in the display images overlaid over the images captured by the first camera 930A and the second camera 930B. As indicated above, the HMD 910 may also include a fifth camera 930E and sixth camera 930F. In some cases, the third camera 930C, fourth camera 930D, fifth camera 930E and sixth camera 930F may be used primarily for tracking and mapping and images captured by these cameras may not typically be displayed to the user 920.

The HMD 910 includes no wheels, propellers or other conveyance of its own. Instead, the HMD 910 relies on the movements of the user 920 to move the HMD 910 about the environment. Thus, in some cases, the HMD 910, when performing a SLAM technique, can skip path planning using a path planning engine and/or movement actuation using the movement actuator. In some cases, the HMD 910 can still perform path planning using a path planning engine, and can indicate directions to follow a suggested path to the user 920 to direct the user along the suggested path planned using the path planning engine. In some cases, for instance where the HMD 910 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. If the environment is a virtual environment, then the HMD 910 can still perform path planning using the path planning engine and/or movement actuation. If the environment is a virtual environment, the HMD 910 can perform movement actuation using the movement actuator by performing a virtual movement within the virtual environment. Even if an environment is virtual, SLAM techniques may still be valuable, as the virtual environment can be unmapped and/or may have been generated by a device other than the HMD 910, such as a remote server or console associated with a video game or video game platform. In some cases, feature tracking and/or SLAM may be performed in a virtual environment even by vehicle or other device that has its own physical conveyance system that allows it to physically move about a physical environment. For example, SLAM may be performed in a virtual environment to test whether a SLAM system is working properly without wasting time or energy on movement and without wearing out a physical conveyance system.

Figure 10A:
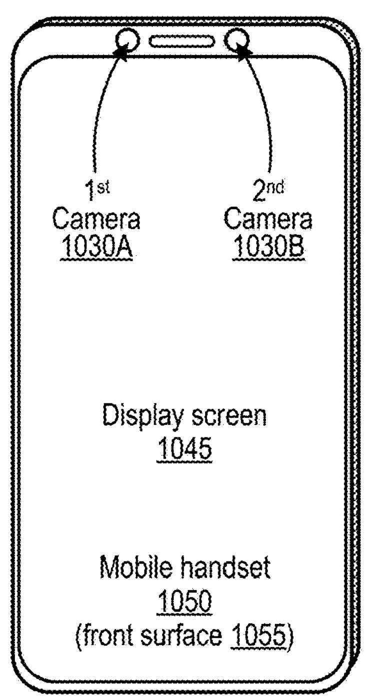
FIG. 10A is a perspective diagram illustrating a front surface of a mobile device that performs feature tracking and/or visual simultaneous localization and mapping (VSLAM) using one or more front-facing cameras, in accordance with some examples.

FIG. 10A is a perspective diagram 1000 illustrating a front surface 1055 of a mobile device 1050 that performs feature tracking and/or visual simultaneous localization and mapping (VSLAM) using one or more front-facing cameras 1030A-B, in accordance with some examples. The mobile device 1050 may be, for example, a cellular telephone, a satellite phone, a portable gaming console, a music player, a health tracking device, a wearable device, a wireless communication device, a laptop, a mobile device, any other type of computing device or computing system 1100 discussed herein, or a combination thereof. The front surface 1055 of the mobile device 1050 includes a display screen 1045. The front surface 1055 of the mobile device 1050 includes a first camera 1030A and a second camera 1030B. The first camera 1030A and the second camera 1030B are illustrated in a bezel around the display screen 1045 on the front surface 1055 of the mobile device 1050. In some examples, the first camera 1030A and the second camera 1030B can be positioned in a notch or cutout that is cut out from the display screen 1045 on the front surface 1055 of the mobile device 1050. In some examples, the first camera 1030A and the second camera 1030B can be under-display cameras that are positioned between the display screen 1045 and the rest of the mobile device 1050, so that light passes through a portion of the display screen 1045 before reaching the first camera 1030A and the second camera 1030B. The first camera 1030A and the second camera 1030B of the perspective diagram 1000 are front-facing cameras. The first camera 1030A and the second camera 1030B face a direction perpendicular to a planar surface of the front surface 1055 of the mobile device 1050. In some examples, the front surface 1055 of the mobile device 1050 may only have a single camera. In some examples, the mobile device 1050 may include one or more additional cameras in addition to the first camera 1030A and the second camera 1030B. In some examples, the mobile device 1050 may include one or more additional sensors in addition to the first camera 1030A and the second camera 1030B.

Figure 10B:
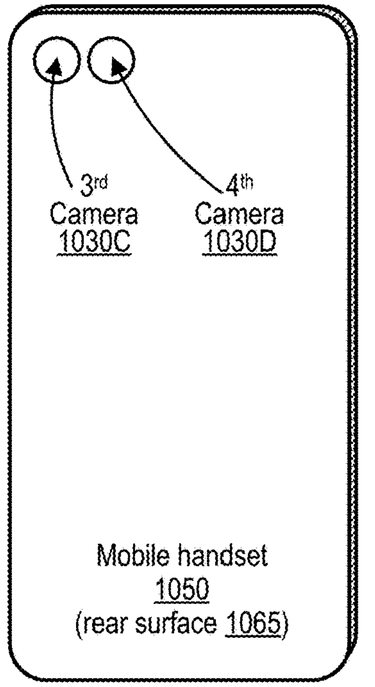
FIG. 10B is a perspective diagram illustrating a rear surface of a mobile device, in accordance with aspects of the present disclosure.

FIG. 10B is a perspective diagram 1090 illustrating a rear surface 1065 of a mobile device 1050. The mobile device 1050 includes a third camera 1030C and a fourth camera 1030D on the rear surface 1065 of the mobile device 1050. The third camera 1030C and the fourth camera 1030D of the perspective diagram 1090 are rear-facing. The third camera 1030C and the fourth camera 1030D face a direction perpendicular to a planar surface of the rear surface 1065 of the mobile device 1050. While the rear surface 1065 of the mobile device 1050 does not have a display screen 1045 as illustrated in the perspective diagram 1090, in some examples, the rear surface 1065 of the mobile device 1050 may have a second display screen. If the rear surface 1065 of the mobile device 1050 has a display screen 1045, any positioning of the third camera 1030C and the fourth camera 1030D relative to the display screen 1045 may be used as discussed with respect to the first camera 1030A and the second camera 1030B at the front surface 1055 of the mobile device 1050. In some examples, the rear surface 1065 of the mobile device 1050 may only have a single camera. In some examples, the mobile device 1050 may include one or more additional cameras in addition to the first camera 1030A, the second camera 1030B, the third camera 1030C, and the fourth camera 1030D. In some examples, the mobile device 1050 may include one or more additional sensors in addition to the first camera 1030A, the second camera 1030B, the third camera 1030C, and the fourth camera 1030D.

Like the HMD 1010, the mobile device 1050 includes no wheels, propellers, or other conveyance of its own. Instead, the mobile device 1050 relies on the movements of a user holding or wearing the mobile device 1050 to move the mobile device 1050 about the environment. Thus, in some cases, the mobile device 1050, when performing a SLAM technique, can skip path planning using the path planning engine and/or movement actuation using the movement actuator. In some cases, the mobile device 1050 can still perform path planning using the path planning engine, and can indicate directions to follow a suggested path to the user to direct the user along the suggested path planned using the path planning engine. In some cases, for instance where the mobile device 1050 is used for AR, VR, MR, or XR, the environment may be entirely or partially virtual. In some cases, the mobile device 1050 may be slotted into a head-mounted device (HMD) (e.g., into a cradle of the HMD) so that the mobile device 1050 functions as a display of the HMD, with the display screen 1045 of the mobile device 1050 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1050. The movement actuator may include any such input device. Movement through the virtual environment may not require wheels, propellers, legs, or any other form of conveyance. If the environment is a virtual environment, then the mobile device 1050 can still perform path planning using the path planning engine and/or movement actuation. If the environment is a virtual environment, the mobile device 1050 can perform movement actuation using the movement actuator by performing a virtual movement within the virtual environment FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. An apparatus for identifying an object, comprising: at least one memory; and at least one processor coupled to the at least one memory and configured to: receive pose information associated with a pose of a hand; identify a cluster of virtual objects the hand is moving toward based on the received pose information, wherein the cluster of virtual objects includes a plurality of independent virtual objects; obtain a set of expected hand postures associated with virtual objects of the cluster of virtual objects; determine a hand posture based on the received pose information; match the hand posture to an expected hand posture of the set of expected hand postures to determine an initial hand posture of the hand; and identify a first initial object of the cluster of virtual objects based on the initial hand posture.

Aspect 2. The apparatus of Aspect 1, wherein the virtual objects are associated with a plurality of applications.

Aspect 3. The apparatus of Aspect 2, wherein the at least one processor is further configured to preload a first process of a first application, of the plurality of applications, wherein the first application is associated with the first initial object.

Aspect 4. The apparatus of Aspect 3, wherein the first process is a preloaded as a background process.

Aspect 5. The apparatus of any of Aspects 3-4, wherein the at least one processor is further configured to: identify a second initial object of the cluster of virtual objects based on the initial hand posture; determine to preload the first process of the first application as a foreground process; preload the first process of the first application as the foreground process; and preload a second process of a second application, of the plurality of applications, as a background process, wherein the second application is associated with the second initial object.

Aspect 6. The apparatus of Aspect 5, wherein the at least one processor is configured to determine to preload the first process of the first application as a foreground process based on a comparison between a first distance between the hand and the first initial object and a second distance between the hand and the second initial object.

Aspect 7. The apparatus of any of Aspects 3-6, wherein the at least one processor is further configured to: determine a predicted set of virtual objects based on the initial hand posture, wherein the first initial object is in the predicted set of virtual objects; receive updated pose information for the hand; determine a final hand posture of the hand based on the updated pose information; and identify a selected virtual object based on the final hand posture of the hand.

Aspect 8. The apparatus of Aspect 7, wherein the first process is preloaded between a time period between determining the initial hand posture and determining the final hand posture.

Aspect 9. The apparatus of any of Aspects 7-8, wherein the selected virtual object is the first initial object, and wherein the at least one processor is further configured to bring the first application to a foreground.

Aspect 10. The apparatus of any of Aspects 7-9, wherein the at least one processor is further configured to: identify a second initial object of the cluster of virtual objects based on the initial hand posture, the second initial object associated with a second application of the plurality of applications; preload a second process of the second application as a background process; determine that the selected virtual object is the second initial object; remove the preloaded first process; and bring the second application to a foreground.

Aspect 11. The apparatus of Aspect 10, wherein, to determine that the selected virtual object is the second initial object, the at one processor is configured to: receive updated pose information for the hand; determine the final hand posture of the hand based on the updated pose information; and determine the final hand posture matches a posture associated with the second initial object.

Aspect 12. A method for identifying an object, comprising: receiving pose information associated with a pose of a hand; identifying a cluster of virtual objects the hand is moving toward based on the received pose information, wherein the cluster of virtual objects includes a plurality of independent virtual objects; obtaining a set of expected hand postures associated with virtual objects of the cluster of virtual objects; determining a hand posture based on the received pose information; matching the hand posture to an expected hand posture of the set of expected hand postures to determine an initial hand posture of the hand; and identifying a first initial object of the cluster of virtual objects based on the initial hand posture.

Aspect 13. The method of Aspect 12, wherein the cluster of virtual objects are associated with a plurality of applications.

Aspect 14. The method of Aspect 13, further comprising preloading a first process of a first application, of the plurality of applications, wherein the first application is associated with the first initial object.

Aspect 15. The method of Aspect 14, wherein the first process is a preloaded as a background process.

Aspect 16. The method of any of Aspects 14-15, further comprising: identifying a second initial object of the cluster of virtual objects based on the initial hand posture; determining to preload the first process of the first application as a foreground process; preloading the first process of the first application as the foreground process; and preloading a second process of a second application, of the plurality of applications, as a background process wherein the second application is associated with the second initial object.

Aspect 17. The method of Aspect 16, wherein determining to preload the first process of the first application as a foreground process is based on a comparison between a first distance between the hand and the first initial object and a second distance between the hand and the second initial object.

Aspect 18. The method of any of Aspects 14-17, further comprising: determining a predicted set of virtual objects based on the initial hand posture, wherein the first initial object is in the predicted set of virtual objects; receiving updated pose information for the hand; determining a final hand posture of the hand based on the updated pose information; and identifying a selected virtual object based on the final hand posture of the hand.

Aspect 19. The method of Aspect 18, wherein the first process is preloaded between a time period between determining the initial hand posture and determining the final hand posture.

Aspect 20. The method of any of Aspects 18-19, wherein the selected virtual object is the first initial object, and further comprising bringing the first application to a foreground.

Aspect 21. The method of any of Aspects 18-20, further comprising: identifying a second initial object of the cluster of virtual objects based on the initial hand posture, the second initial object associated with a second application of the plurality of applications; preloading a second process of the second application as a background process; determining that the selected virtual object is the second initial object; removing the preloaded first process; and bringing the second application to a foreground.

Aspect 22. The method of Aspect 21, wherein determining that the selected virtual object is the second initial object comprises: receiving updated pose information for the hand; determining the final hand posture of the hand based on the updated pose information; and determining the final hand posture matches a posture associated with the second initial object.

Aspect 23. A non-transitory computer-readable medium having stored thereon instructions that, when executed by at least one processor, cause the at least one processor to: receive pose information associated with a pose of a hand; identify a cluster of virtual objects the hand is moving toward based on the received pose information, wherein the cluster of virtual objects includes a plurality of independent virtual objects; obtain a set of expected hand postures associated with virtual objects of the cluster of virtual objects; determine a hand posture based on the received pose information; match the hand posture to an expected hand posture of the set of expected hand postures to determine an initial hand posture of the hand; and identify a first initial object of the cluster of virtual objects based on the initial hand posture.

Aspect 24. The non-transitory computer-readable medium of Aspect 23, wherein the virtual objects are associated with a plurality of applications.

Aspect 25. The non-transitory computer-readable medium of Aspect 24, wherein the instructions further cause the at least one processor to preload a first process of a first application, of the plurality of applications, wherein the first application is associated with the first initial object.

Aspect 26. The non-transitory computer-readable medium of Aspect 25, wherein the first process is a preloaded as a background process.

Aspect 27. The non-transitory computer-readable medium of any of Aspects 25-26, wherein the instructions further cause the at least one processor to: identify a second initial object of the cluster of virtual objects based on the initial hand posture; determine to preload the first process of the first application as a foreground process; preload the first process of the first application as the foreground process; and preload a second process of a second application, of the plurality of applications, as a background process, wherein the second application is associated with the second initial object.

Aspect 28. The non-transitory computer-readable medium of Aspect 27, wherein the instructions cause the at least one processor to determine to preload the first process of the first application as a foreground process based on a comparison between a first distance between the hand and the first initial object and a second distance between the hand and the second initial object.

Aspect 29. The non-transitory computer-readable medium of any of Aspects 25-28, wherein the instructions further cause the at least one processor to: determine a predicted set of virtual objects based on the initial hand posture, wherein the first initial object is in the predicted set of virtual objects; receive updated pose information for the hand; determine a final hand posture of the hand based on the updated pose information; and identify a selected virtual object based on the final hand posture of the hand.

Aspect 30. The non-transitory computer-readable medium of any of Aspects 29, wherein the first process is preloaded between a time period between determining the initial hand posture and determining the final hand posture.

Aspect 31. An apparatus for pose prediction comprising one or more means for performing operations according to any of aspects 12-22.

Aspect 32. The apparatus of any of Aspects 1 to 11, wherein the apparatus is a mobile device.

Aspect 33. A non-transitory computer readable medium having stored thereon instructions that, when executed by at least one processor, cause the at least one processor to perform operations according to any of Aspects 12-22.

What is claimed is:

1. An apparatus for identifying an object, comprising:

at least one memory; and at least one processor coupled to the at least one memory and configured to:

receive pose information associated with a pose of a hand;

identify a cluster of virtual objects the hand is moving toward based on the received pose information, wherein the cluster of virtual objects includes a plurality of independent virtual objects;

obtain a set of expected hand postures associated with virtual objects of the cluster of virtual objects, wherein each virtual object of the cluster of virtual objects is associated with one or more hand postures of the set of expected hand postures, and wherein a first virtual object is associated with a different hand posture as compared to a second virtual object that is different than the first virtual object;

determine a hand posture based on the received pose information;

match the hand posture to an expected hand posture of the set of expected hand postures to determine an initial hand posture of the hand; and identify a first initial object of the cluster of virtual objects based on the initial hand posture.

2. The apparatus of claim 1, wherein the virtual objects are associated with a plurality of applications.

3. The apparatus of claim 2, wherein the at least one processor is further configured to preload a first process of a first application, of the plurality of applications, wherein the first application is associated with the first initial object.

4. The apparatus of claim 3, wherein the first process is preloaded as a background process.

5. The apparatus of claim 3, wherein the at least one processor is further configured to:

identify a second initial object of the cluster of virtual objects based on the initial hand posture;

determine to preload the first process of the first application as a foreground process;

preload the first process of the first application as the foreground process; and preload a second process of a second application, of the plurality of applications, as a background process, wherein the second application is associated with the second initial object.

6. The apparatus of claim 5, wherein the at least one processor is configured to determine to preload the first process of the first application as a foreground process based on a comparison between a first distance between the hand and the first initial object and a second distance between the hand and the second initial object.

7. The apparatus of claim 3, wherein the at least one processor is further configured to:

determine a predicted set of virtual objects based on the initial hand posture, wherein the first initial object is in the predicted set of virtual objects;

receive updated pose information for the hand;

determine a final hand posture of the hand based on the updated pose information; and identify a selected virtual object based on the final hand posture of the hand.

8. The apparatus of claim 7, wherein the first process is preloaded between a time period between determining the initial hand posture and determining the final hand posture.

9. The apparatus of claim 7, wherein the selected virtual object is the first initial object, and wherein the at least one processor is further configured to bring the first application to a foreground.

10. The apparatus of claim 7, wherein the at least one processor is further configured to:

identify a second initial object of the cluster of virtual objects based on the initial hand posture, the second initial object associated with a second application of the plurality of applications;

preload a second process of the second application as a background process;

determine that the selected virtual object is the second initial object;

remove the preloaded first process; and bring the second application to a foreground.

11. The apparatus of claim 10, wherein, to determine that the selected virtual object is the second initial object, the at least one processor is configured to:

receive updated pose information for the hand;

determine the final hand posture of the hand based on the updated pose information; and determine the final hand posture matches a posture associated with the second initial object.

12. A method for identifying an object, comprising:

receiving pose information associated with a pose of a hand;

identifying a cluster of virtual objects the hand is moving toward based on the received pose information, wherein the cluster of virtual objects includes a plurality of independent virtual objects;

obtaining a set of expected hand postures associated with virtual objects of the cluster of virtual objects, wherein each virtual object of the cluster of virtual objects is associated with one or more hand postures of the set of expected hand postures, and wherein a first virtual object is associated with a different hand posture as compared to a second virtual object that is different than the first virtual object;

determining a hand posture based on the received pose information;

matching the hand posture to an expected hand posture of the set of expected hand postures to determine an initial hand posture of the hand; and identifying a first initial object of the cluster of virtual objects based on the initial hand posture.

13. The method of claim 12, wherein the cluster of virtual objects are associated with a plurality of applications.

14. The method of claim 13, further comprising preloading a first process of a first application, of the plurality of applications, wherein the first application is associated with the first initial object.

15. The method of claim 14, wherein the first process is preloaded as a background process.

16. The method of claim 14, further comprising:

identifying a second initial object of the cluster of virtual objects based on the initial hand posture;

determining to preload the first process of the first application as a foreground process;

preloading the first process of the first application as the foreground process; and preloading a second process of a second application, of the plurality of applications, as a background process wherein the second application is associated with the second initial object.

17. The method of claim 16, wherein determining to preload the first process of the first application as a foreground process is based on a comparison between a first distance between the hand and the first initial object and a second distance between the hand and the second initial object.

18. The method of claim 14, further comprising:

determining a predicted set of virtual objects based on the initial hand posture, wherein the first initial object is in the predicted set of virtual objects;

receiving updated pose information for the hand;

determining a final hand posture of the hand based on the updated pose information; and identifying a selected virtual object based on the final hand posture of the hand.

19. The method of claim 18, wherein the first process is preloaded between a time period between determining the initial hand posture and determining the final hand posture.

20. The method of claim 18, wherein the selected virtual object is the first initial object, and further comprising bringing the first application to a foreground.

21. The method of claim 18, further comprising:

identifying a second initial object of the cluster of virtual objects based on the initial hand posture, the second initial object associated with a second application of the plurality of applications;

preloading a second process of the second application as a background process;

determining that the selected virtual object is the second initial object;

removing the preloaded first process; and bringing the second application to a foreground.

22. The method of claim 21, wherein determining that the selected virtual object is the second initial object comprises:

receiving updated pose information for the hand;

determining the final hand posture of the hand based on the updated pose information; and determining the final hand posture matches a posture associated with the second initial object.

23. A non-transitory computer-readable medium having stored thereon instructions that, when executed by at least one processor, cause the at least one processor to:

receive pose information associated with a pose of a hand;

identify a cluster of virtual objects the hand is moving toward based on the received pose information, wherein the cluster of virtual objects includes a plurality of independent virtual objects;

obtain a set of expected hand postures associated with virtual objects of the cluster of virtual objects, wherein each virtual object of the cluster of virtual objects is associated with one or more hand postures of the set of expected hand postures, and wherein a first virtual object is associated with a different hand posture as compared to a second virtual object that is different than the first virtual object;

determine a hand posture based on the received pose information;

match the hand posture to an expected hand posture of the set of expected hand postures to determine an initial hand posture of the hand; and identify a first initial object of the cluster of virtual objects based on the initial hand posture.

24. The non-transitory computer-readable medium of claim 23, wherein the virtual objects are associated with a plurality of applications.

25. The non-transitory computer-readable medium of claim 24, wherein the instructions further cause the at least one processor to preload a first process of a first application, of the plurality of applications, wherein the first application is associated with the first initial object.

26. The non-transitory computer-readable medium of claim 25, wherein the first process is preloaded as a background process.

27. The non-transitory computer-readable medium of claim 25, wherein the instructions further cause the at least one processor to:

identify a second initial object of the cluster of virtual objects based on the initial hand posture;

determine to preload the first process of the first application as a foreground process;

preload the first process of the first application as the foreground process; and preload a second process of a second application, of the plurality of applications, as a background process, wherein the second application is associated with the second initial object.

28. The non-transitory computer-readable medium of claim 27, wherein the instructions cause the at least one processor to determine to preload the first process of the first application as a foreground process based on a comparison between a first distance between the hand and the first initial object and a second distance between the hand and the second initial object.

29. The non-transitory computer-readable medium of claim 25, wherein the instructions further cause the at least one processor to:

determine a predicted set of virtual objects based on the initial hand posture, wherein the first initial object is in the predicted set of virtual objects;

receive updated pose information for the hand;

determine a final hand posture of the hand based on the updated pose information; and identify a selected virtual object based on the final hand posture of the hand.

30. The non-transitory computer-readable medium of claim 29, wherein the first process is preloaded between a time period between determining the initial hand posture and determining the final hand posture.

31. An apparatus for identifying an object, comprising:

at least one memory; and at least one processor coupled to the at least one memory and configured to:

receive pose information associated with a pose of a hand;

identify a cluster of virtual objects the hand is moving toward based on the received pose information, wherein the cluster of virtual objects includes a plurality of independent virtual objects, and the virtual objects are associated with a plurality of applications;

determine a hand posture based on the received pose information;

match the hand posture to an expected hand posture of a set of expected hand postures, associated with the virtual objects, to determine an initial hand posture of the hand;

determine a predicted set of virtual objects based on the initial hand posture;

identify a first initial object of the cluster of virtual objects based on the initial hand posture, wherein the first initial object is in the predicted set of virtual objects;

preload a first process of a first application, of the plurality of applications, wherein the first application is associated with the first initial object;

receive updated pose information for the hand;

determine a final hand posture for the hand based on the updated pose information; and identify a virtual object of the cluster of the virtual objects based on the final hand posture, wherein the first process is preloaded between a time-period between determining the initial hand posture and the final hand posture.

* * * * *